(12) United States Patent
Chang et al.

(10) Patent No.: US 8,635,226 B2
(45) Date of Patent: Jan. 21, 2014

(54) COMPUTING USER MICRO-SEGMENTS FOR OFFER MATCHING

(75) Inventors: Walter Chang, San Jose, CA (US); Geoff Baum, Palo Alto, CA (US); Thomas Malloy, Portola Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/039,257

(22) Filed: Mar. 2, 2011

(65) Prior Publication Data

US 2012/0226697 A1    Sep. 6, 2012

(51) Int. Cl.
*G06F 17/30*    (2006.01)

(52) U.S. Cl.
CPC .............................. *G06F 17/30017* (2013.01)
USPC ........................................................ 707/740

(58) Field of Classification Search
USPC ......... 707/740, 748, 749, 758; 705/14, 26, 30
See application file for complete search history.

(56) References Cited

U.S. PATENT DOCUMENTS

| | | | |
|---|---|---|---|
| 5,636,346 A | 6/1997 | Saxe | |
| 5,892,900 A | 4/1999 | Ginter et al. | |
| 6,317,872 B1 | 11/2001 | Gee et al. | |
| 6,519,571 B1 | 2/2003 | Guheen et al. | |
| 7,072,858 B1 | 7/2006 | Litzow et al. | |
| 7,174,381 B2* | 2/2007 | Gulko et al. | 709/226 |
| 7,224,185 B2 | 5/2007 | Campbell et al. | |
| 7,599,851 B2 | 10/2009 | Frengut et al. | |
| 7,992,171 B2 | 8/2011 | Amidon et al. | |
| 2001/0013009 A1 | 8/2001 | Greening et al. | |
| 2001/0032128 A1* | 10/2001 | Kepecs | 705/14 |
| 2003/0023482 A1 | 1/2003 | Messner et al. | |
| 2005/0114366 A1 | 5/2005 | Mathai et al. | |
| 2006/0212355 A1 | 9/2006 | Teague | |
| 2007/0230706 A1 | 10/2007 | Youn | |
| 2008/0090513 A1 | 4/2008 | Collins et al. | |
| 2009/0164441 A1 | 6/2009 | Cheyer | |
| 2009/0271263 A1 | 10/2009 | Regmi et al. | |
| 2010/0042471 A1 | 2/2010 | Chang et al. | |

(Continued)

OTHER PUBLICATIONS

Xie Wen-xiu et al., Market basket analysis based on text segmentation and association rule mining, 2010, IEEE, vol. 2, 952-955.*

(Continued)

*Primary Examiner* — Jean B Fleurantin
(74) *Attorney, Agent, or Firm* — Wolfe-SBMC

(57) ABSTRACT

User data and a plurality of micro-segment definitions such that each micro-segment definition in the plurality of micro-segment definitions corresponds to one or more offers in an offer provider campaign are received. Further, a dispatcher dispatches a first subset of the user data and a first subset of the plurality of the micro-segment definitions to a first node in a network. In addition, the dispatcher dispatches a second subset of the user data and a second subset of the plurality of the micro-segment definitions to a second node in the network. Parsing and compiling are performed at each node. Further, parallel processing is performed at a scalable evaluation engine at each node to apply micro-segment condition rules to user data to determine matches to micro-segments. Computation of micro-segments occurs in parallel and resulting micro-segment assignments are collected, filtered to remove duplicates, then ranked to produce a final set of micro-segments that can be used to find offers.

20 Claims, 16 Drawing Sheets

(56) References Cited

U.S. PATENT DOCUMENTS

| | | | |
|---|---|---|---|
| 2010/0094878 | A1 | 4/2010 | Soroca et al. |
| 2010/0106568 | A1 | 4/2010 | Grimes |
| 2010/0138867 | A1 | 6/2010 | Wong et al. |
| 2010/0211464 | A1 | 8/2010 | Zhu et al. |
| 2010/0268600 | A1 | 10/2010 | Banko et al. |
| 2012/0226559 | A1 | 9/2012 | Baum et al. |
| 2012/0226562 | A1 | 9/2012 | Baum et al. |
| 2012/0226700 | A1 | 9/2012 | Chang et al. |

OTHER PUBLICATIONS

"Lawson M3 Manufacturing Operations: Attribute Control", Lawson Software, Inc. 5636346,(2008), 12 pages.

"Non-Final Office Action", U.S. Appl. No. 12/862,386, (Oct. 9, 2012), 8 pages.

"Non-Final Office Action", U.S. Appl. No. 13/039,177, (Sep. 10, 2012), 19 pages.

"Non-Final Office Action", U.S. Appl. No. 13/039,207, (Sep. 13, 2012), 16 pages.

"Non-Final Office Action", U.S. Appl. No. 13/039,242, (Jun. 8, 2012), 10 pages.

"Non-Final Office Action", U.S. Appl. No. 13/153,328, (Jun. 8, 2012), 8 pages.

"SQL Tutorials—Lesson 1: SQL Startup", Retrieved from: <http://www.functionx.com/sql/Lesson01.htm> on Aug. 20, 2012,(2004-2007), 4 pages.

De Haan, Lex et al., "Nulls: Nothing to Worry About", Retrieved from: <http://www.oracle.com/technetwork/issue-archive/2005/05-jul/o45sql-097727.html> on Aug. 20, 2012,(Jul. 2005), 1 page.

Preiss, Bruno R., "Data Structures and Algorithms with Object-Oriented Design Patterns in Java", Retreived from: <http://www.brpreiss.com/books/opus5/html/page264.html> on Aug. 20, 2012,(1998), 2 pages.

"Final Office Action", U.S. Appl. No. 12/862,386, (Mar. 26, 2013), 11 pages.

"Final Office Action", U.S. Appl. No. 12/862,386, (Apr. 9, 2013), 12 pages.

"Non-Final Office Action", U.S. Appl. No. 13/039,266, (Mar. 12, 2013), 12 pages.

"Non-Final Office Action", U.S. Appl. No. 13/153,328, (Mar. 20, 2013), 13 pages.

"Final Office Action", U.S. Appl. No. 12/862,386, (Jun. 26, 2013),13 pages.

"Final Office Action", U.S. Appl. No. 13/039,266, (Aug. 5, 2013),14 pages.

"Non-Final Office Action", U.S. Appl. No. 13/039,207, (Aug. 15, 2013), 20 pages.

"Notice of Allowance", U.S. Appl. No. 13/039,177, (Sep. 4, 2013), 7 pages.

"Notice of Allowance", U.S. Appl. No. 13/153,328, (Sep. 4, 2013), 7 pages.

\* cited by examiner

*Figure 5A*

```
(ExampleUser.zipcode in (94301, 94302, 94303, 94304, 94306, 94309)) or
(ExampleUser.zipcode between (94085, 94089)) or
(ExampleUser.zipcode between (95050, 95056)) or
(ExampleUser.zipcode between (95010, 95196))
end (ExampleCore.Gender == "M") and
(ExampleCore.Income between(50000,100000)) and
(DataProvider1Data.MonthlyPowerBill >= 200)
) or
(ExampleWish.ProductCategory in ("Greer Electronics",
                                 "Power Conservation")) or
(ExampleBran.BrandName in ("P3 International", "Brand XYZ"))
```

*Figure 7*

COMPUTING USER MICRO-SEGMENTS FOR OFFER MATCHING

BACKGROUND

1. Field

This disclosure generally relates to classification of consumers. More particularly, the disclosure relates to determining micro-segments to which consumers belong.

2. General Background

Content providers, merchants, and marketers have to precisely define and target highly specific market segments in order to effectively deliver the most relevant online content. Examples of the most relevant online content are advertising, offers, entertainment, news, etc.

A micro-segment is a precise division of a market or population that is typically identified by marketers through advanced technology and techniques. For example, data mining, artificial intelligence, and various algorithms may be utilized. These technologies and techniques are utilized to group consumers into fine-grained segments by recognizing and predicting minute consumer spending and behavioral patterns, i.e., micro-segmentation. In other words, a micro-segment is a group of (purchase) decision makers who share similar attributes, purchase behavior, and/or level of interest in a specific set of features. In the current environment, however, classifying and segmenting a new user community into micro-segments may be difficult for a number of reasons. In particular, consumers are increasingly filtering content and marketing messages, which reduces marketer efficacy. Further, even as more consumer data and behaviors are collected, most are under-utilized because of the lack of industry expertise and limitations of available technology. In addition, meaningful segmentation within newly created user communities and populations is difficult.

Further, segmentation difficulties also affect numerous websites that leverage the recorded behaviors of large numbers of site users in determining recommended content, products, and services for various user segments. Recommendation systems utilize algorithms that may vary from k-nearest neighbor approaches to preference/interest/taste similarity methods, e.g., found by using Pearson Correlation, to collaborative filtering algorithms, e.g., people who buy X also buy Y. A challenge with all of these approaches is having an accurate segmentation of very large user populations based on recorded preferences and behaviors before the system can make effective recommendations.

SUMMARY

In one aspect of the disclosure, a computer program product is provided. The computer program product includes a computer useable medium having a computer readable program. The computer readable program when executed on a computer causes the computer to receive user data and a plurality of micro-segment definitions such that each micro-segment definition in the plurality of micro-segment definitions corresponds to one or more offers in an offer provider campaign. Further, the computer readable program when executed on the computer causes the computer to receive user data and a plurality of micro-segment definitions such that each micro-segment definition in the plurality of micro-segment definitions corresponds to one or more offers in an offer provider campaign. In addition, the computer readable program when executed on the computer causes the computer to receive user data and a plurality of micro-segment definitions such that each micro-segment definition in the plurality of micro-segment definitions corresponds to one or more offers in an offer provider campaign. The computer readable program when executed on the computer also causes the computer to receive user data and a plurality of micro-segment definitions such that each micro-segment definition in the plurality of micro-segment definitions corresponds to one or more offers in an offer provider campaign. Further, the computer readable program when executed on the computer causes the computer to dispatch, with a dispatcher, a first subset of the user data and a first subset of the plurality of the micro-segment definitions to a first node in a network. In addition, the computer readable program when executed on the computer causes the computer to dispatch, with a dispatcher, a first subset of the user data and a first subset of the plurality of the micro-segment definitions to a first node in a network. The computer readable program when executed on the computer also causes the computer to dispatch, with the dispatcher, a second subset of the user data and a second subset of the plurality of the micro-segment definitions to a second node in the network. Further, the computer readable program when executed on the computer causes the computer to parse, with a first micro-segment parser at the first node, each micro-segment definition from the first subset of the plurality of micro-segment definitions into a first plurality of parsed expression segments that indicate a first plurality of micro-segment condition rules. In addition, the computer readable program when executed on the computer causes the computer to parse, with a second micro-segment parser at the second node, each micro-segment definition from the second subset of the plurality of micro-segment definitions into a second plurality of parsed expression segments that indicate a second plurality of micro-segment condition rules. The computer readable program when executed on the computer also causes the computer to compile, with a first compiler at the first node, the first plurality of parsed expression segments into a first executable object that indicates a first plurality of instructions to determine if the first subset of user data matches the first plurality of micro-segment definitions. Further, the computer readable program when executed on the computer causes the computer to compile, with a second compiler at the second node, the second plurality of parsed expression segments into a second executable object that indicates a second plurality of instructions to determine if the second subset of user data matches the second plurality of micro-segment definitions. In addition, the computer readable program when executed on the computer causes the computer to process in parallel the first executable object, with a first scalable evaluation engine, to apply the first plurality of micro-segment condition rules to the first subset of user data to determine a match of a first user belonging to a micro-segment and the second executable object, with a second scalable evaluation engine, to apply the second plurality of micro-segment condition rules to the second subset of user data to determine a match of a second user belonging to the micro-segment. The computer readable program when executed on the computer also causes the computer to assign in parallel a first score, with the first scalable evaluation engine, and a second score, with the second scalable evaluation engine, to indicate the strength of each match for the micro-segment. A single computer program or multiple computer programs may be utilized. Further, a monolithic single thread computer program or distributed system may be utilized.

In another aspect of the disclosure, a process is provided. The process receives user data and a plurality of micro-segment definitions such that each micro-segment definition in the plurality of micro-segment definitions corresponds to one or more offers in an offer provider campaign. Further, the process dispatches, with a dispatcher, a first subset of the user data and a first subset of the plurality of the micro-segment definitions to a first node in a network. In addition, the process dispatches, with the dispatcher, a second subset of the user data and a second subset of the plurality of the micro-segment definitions to a second node in the network. The process also parses, with a first micro-segment parser at the first node, each micro-segment definition from the first subset of the plurality of micro-segment definitions into a first plurality of parsed expression segments that indicate a first plurality of micro-segment condition rules. Further, the process pareses, with a second micro-segment parser at the second node, each micro-segment definition from the second subset of the plurality of micro-segment definitions into a second plurality of parsed expression segments that indicate a second plurality of micro-segment condition rules. In addition, the process compiles, with a first compiler at the first node, the first plurality of parsed expression segments into a first executable object that indicates a first plurality of instructions to determine if the first subset of user data matches the first plurality of micro-segment definitions. The process also compiles, with a second compiler at the second node, the second plurality of parsed expression segments into a second executable object that indicates a second plurality of instructions to determine if the second subset of user data matches the second plurality of micro-segment definitions. Further, the process processes in parallel the first executable object, with a first scalable evaluation engine, to apply the first plurality of micro-segment condition rules to the first subset of user data to determine a match of a first user belonging to a micro-segment and the second executable object, with a second scalable evaluation engine, to apply the second plurality of micro-segment condition rules to the second subset of user data to determine a match of a second user belonging to the micro-segment. In addition, the process assigns in parallel a first score, with the first scalable evaluation engine and a second score, with the second scalable evaluation engine, to indicate the strength of each match for the micro-segment.

In yet another aspect of the disclosure, a system is provided. The system includes a reception module that receives user data and a plurality of micro-segment definitions such that each micro-segment definition in the plurality of micro-segment definitions corresponds to one or more offers in an offer provider campaign. Further, the system includes a dispatcher module that (i) dispatches a first subset of the user data and a first subset of the plurality of the micro-segment definitions to a first node in a network and (ii) dispatches a second subset of the user data and a second subset of the plurality of the micro-segment definitions to a second node in the network. The system also includes a first micro-segment parser at the first node that parses each micro-segment definition from the first subset of the plurality of micro-segment definitions into a first plurality of parsed expression segments that indicate a first plurality of micro-segment condition rules. Further, the system includes a second micro-segment parser at the second node that parses each micro-segment definition from the second subset of the plurality of micro-segment definitions into a second plurality of parsed expression segments that indicate a second plurality of micro-segment condition rules. In addition, the system includes a first compiler at the first node that compiles the first plurality of parsed expression segments into a first executable object that indicates a first plurality of instructions to determine if the first subset of user data matches the first plurality of micro-segment definitions. The system also includes a second compiler at the second node that compiles the second plurality of parsed expression segments into a second executable object that indicates a second plurality of instructions to determine if the second subset of user data matches the second plurality of micro-segment definitions. Further, the system includes a first scalable evaluation engine that (i) processes in parallel the first executable object to apply the first plurality of micro-segment condition rules to the first subset of user data to determine a match of a first user belonging to a micro-segment and (ii) assigns in parallel a first score to indicate a strength of the match of the first user with the micro-segment. In addition, the system includes a second scalable evaluation engine that (i) processes in parallel the second executable object to apply the second plurality of micro-segment condition rules to the second subset of user data to determine a match of a second user belonging to the micro-segment and (ii) assigns in parallel a first score to indicate a strength of the match of the first user with the micro-segment.

DRAWINGS

The above-mentioned features of the present disclosure will become more apparent with reference to the following description taken in conjunction with the accompanying drawings wherein like reference numerals denote like elements and in which:

FIG. 5A illustrates an example of code 500 for the written form of the expression.

FIG. 7 illustrates an example of code that may be utilized for the expression tree illustrated in FIG. 6.

DETAILED DESCRIPTION

Figure 1:
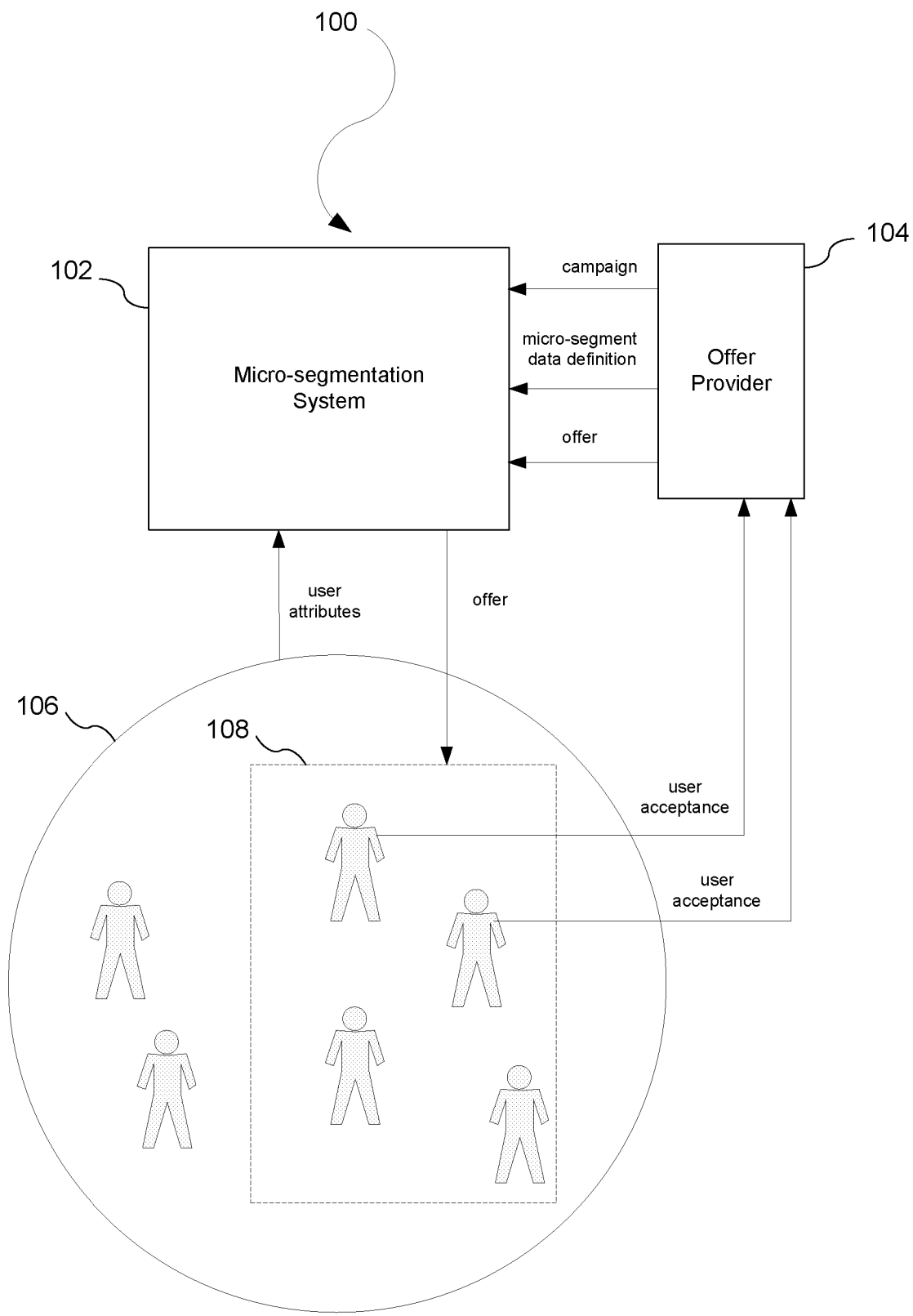
FIG. 1 illustrates a micro-segmentation system configuration.

A scalable engine determines which micro-segments users belong to. As an example, a user may be a consumer. In one embodiment, the scalable engine has multiple cores or multiple processes. The computation structure and operation of the scalable engine differs from a standalone sequential engine. For example, the scalable engine has dispatch, map, and reduce components that are not utilized in the standalone sequential engine. The sequential engine does not have a communications protocol or coordination logic as provided for in the scalable engine. Further, the scalable engine may be replicated across different nodes (homogenous or heterogeneous) in a network. For instance, a web-based scalable engine may be replicated across different nodes throughout the Internet. In addition, the scalable engine may provide persistence into a Standard Query Language ("SQL") data base or a non-SQL ("NoSQL") database.

The scalable engine utilizes a definition of the micro-segment and user data to compute a Boolean expression of True or False to determine whether a predicate of the micro-segment is met. Further, non-Boolean predicates may also be utilized, which result in three-valued logic or real value results. The segment description is parsed into a segment definition parse tree. The segment definition parse tree is then compiled into bytecode. The bytecode is then executed to return segment assignments and scores.

In one embodiment, demographic attributes and behavioral interests of a user are generalized. A segment has a collection of attribute comparison predicates, e.g., Gender==Male, connected by Boolean AND/OR operators, e.g., (Gender==Male) AND (Age between (20,30)). Accordingly, if a quantity n total data attributes are available, then the number of micro-segments may equal $2^n-1$, i.e., the total combination of n attributes. The micro-segment objects allow marketers to define micro-segments from this large space of attributes. Those generalized demographic attributes and behavioral interest are then encapsulated into an object. The behavioral interests may include both positive and negative interests, which allows creation of a comprehensive affinity model. An example of positive or negative interests is likes or dislikes of a brand. In addition, the object supports any complex attribute or interest rule structure that is represented as a syntactic expression tree. Attributes and predicate expressions for matching and recommendations may then be developed for that syntactic expressions tree. Predicates can be connected through conjunctive operators and/or disjunctive operators to create arbitrarily complex micro-segment expressions.

The micro-segment object is portable. In other words, the micro-segment is not hardwired to a particular marketing campaign. The micro-segment is reusable. Accordingly, the micro-segment object provides portable analytics without specific details. In one embodiment, the micro-segment is an opaque encoding of a set of attributes common to a population of consumers. For example, a micro-segment including males, age twenty-five years old with income between eighty thousand dollars to one hundred thousand dollars, and with an interest in sports cars may be encoded as SEG-XYZ. New consumers assigned into segment SEG-XYZ will by definition have the same listed attributes. Given a larger population of consumers with other micro-segments, marketers that share micro-segment definitions and data may perform analytics utilizing the SEG-XYZ encoding without revealing to others the actual definition of the micro-segment. A micro-segment definition is portable as a micro-segment that was successful for one marketer may be shared and utilized by another marketer. The analytics themselves may be performed in a private manner in which the attributes are not revealed to other parties. This configuration is useful in cases when marketers have made prior agreements to share segment definitions and micro-segment consumer data.

Numerous high-value micro-segments within newly created user communities may be identified and created. Advertisers and marketers can automate the creation of customized micro-segments to which they can deliver highly targeted and relevant content across a range of multimedia devices. After the micro-segments are identified, they can be utilized to automate the delivery of content, personalized direct micro-marketing, and micro-promotion campaigns, which target and appeal to the specified tastes, needs, wants, and desires of the member individuals. Micro-marketing is the process by which the system models each consumer as having different ideas and feelings about a company's products, services, prices, and promotions, and appeals to them in an appropriate manner. A consumer refers to a user who is a consumer and utilizes the configurations provided for herein. The micro-segments provide a finer level of granularity than segments. Accordingly, the micro-segments may assist marketers in recognizing and predicting minute consumer spending and behavioral patterns. For example, the micro-segments may be utilized to leverage data sources such as core demographics, category spending over time, fine-grained purchase history, and buying intent. Some of these data sources such as purchase history and category spending may be validated as they are coming from third parties, e.g., credit card companies. As a result, marketers are able to provide more accurate, precise, and targeted offers.

Further, membership within micro-segments may be incrementally and continuously updated within micro-segments. In addition, intentional semantics may be automatically detected and inferred utilizing additionally analytics. For example, if a consumer belongs to a high-end car interest segment, a high-end camera interest segment, and a high-end watch segment, the system may infer that if the consumer has expressed a generic interest in shirts, the consumer may additionally fit into a high-end shirt interest segment.

Further, recommendations may be quickly and accurately generated regarding content, products and services to users within each micro-segment. A recommendation system may be utilized to perform the recommendations. The recommendation system is a system that employs information clustering and filtering techniques that attempt to recommend information content or product items that are likely to be of interest to a specific user (consumer) based on the cluster or segment he or she is in. In one embodiment, a recommendation system compares a user's behaviors and/or explicit profile to some reference characteristics and then seeks to predict the interest 'rating' that a user would give to an item they may have not yet considered. These characteristics may be from the information or product item (using a content-based and/or attribute approach) or the user's social environment (using collaborative filtering approaches).

In one embodiment, each micro-segment includes a specific set of key discriminating features ("KDFs") that defines a group of attributes utilized by decision makers and a volume or value figure to indicate the micro-segment size. FIG. 1 illustrates a micro-segmentation system configuration 100. The micro-segmentation system configuration 100 has a micro-segmentation system 102 that is a third-party trusted system between a merchant 104 and each of a plurality of users 106. The offer provider 104 may be a company selling a product, a company selling a service, a marketing company, an advertising company, or the like that provides a campaign to the micro-segmentation system. The campaign indicates a set of target attributes that the offer provider is looking for in marketing to particular users for a product or service. The campaign may include one or more offers. Accordingly, the set of target attributes refers to the set of attributes the campaign is targeting. As an example, the campaign may be an offer for sale of men's sneakers in the United States of America. The micro-segmentation system 102 receives that campaign and also receives user attributes from the plurality of users 106. The attributes are properties or characteristics. An example of an attribute is gender. Accordingly, the values for the gender attribute may be male or female. The micro-segmentation system 102 then performs a determination of which users in the plurality of users 106 have user attribute values that match the target attributes of the campaign. In other words, the micro-segmentation system 102 evaluates the created micro-segment definitions, attributes values, and value distributions to determine the selectivity of the specific micro-segment. The micro-segmentation system 102 determines a micro-segment 108 that includes users that match the target attributes of the campaign. In one embodiment, all of the target attributes have to equal the user attributes in order for the user to be placed into the micro-segment 108. In another embodiment, a minimum matching score has to be met for the user to be placed into the micro-segment 108. As an example, a user may not have to match all of the attributes, but may match enough of the attributes to generate a score that exceeds the offer provider's minimum threshold and places the consumer in to micro-segment 108. In another embodiment, a weighting mechanism is utilized to weigh certain attributes as opposed to other attributes in the scoring methodology. For example, an age attribute may have a higher weighting in the scoring calculation than a geographic attribute. In one embodiment, the system compensates for attribute bias to prevent attribute overweighting. Similarly, marketers may be allowed to customize the weightings of micro-segment attributes in determining the selectivity of the micro-segment relative to candidate users.

In one embodiment, after the micro-segmentation system 102 automatically classifies users into the micro-segment 108, the micro-segmentation system 102 sends a micro-segment data definition to the offer provider 104. In one embodiment, the micro-segmentation system 102 captures default definitions and/or training data for classifying existing and/or new users. The quantity of segment definitions may range anywhere from a few to billions based upon the number of ways user attributes are combined and utilized. In another embodiment, that micro-segment data definition does not include personal identity information of the users in the micro-segment. In other words, the plurality of users provide attribute information to the micro-segmentation system 102 on a trusted basis such that the micro-segmentation system does not send information that personally identifies the users to the offer provider 104. The system may not send any data to the offer provider other than representative statistics or general statistics about the micro-segment they defined. As an example, a micro-segment may contain twenty-seven thousand three hundred thirty-two consumers. After the offer has been delivered, seventeen thousand three hundred forty-four consumers looked at the offer, three thousand four hundred forty-four consumers clicked on the offer to learn more, and six hundred thirty-four consumers purchased the offer. Further, in one embodiment, the plurality of users 106 provides permission to the micro-segmentation system 102 to send them offers. The micro-segment data definition received by the offer provider 104 provides information such as the number of users in the micro-segment, their attribute values, etc. The offer provider 104 can quickly determine potential interest in a campaign among a target audience, without wasting advertising and resources on people who have no interest in receiving advertising for this specific campaign. As a result, the offer provider 104 can realistically determine if the campaign is economically feasible and the amount of resources that should be dedicated to the campaign, etc. The offer provider can then send an offer to the micro-segmentation system 102 based on the micro-segment data. In other words, the offer provider 104 is not sending the offer directly to the micro-segment 108. After receiving the offer, the micro-segmentation system may then send the offer to the micro-segment. If users in the micro-segment would like to learn more about the offer or accept the offer, the users may then individually contact the offer provider by following a link or some other response mechanism provided in the offer. In another embodiment, micro-segment data other than the micro-segment data definition may also be sent to the offer provider 104. As an example, campaign performance statistics may be sent to the offer provider after the delivery of the campaign in addition to the micro-segment data definition.

In one embodiment, the micro-segmentation system 102 also performs recommendations. The micro-segmentation system 102 may deliver a recommendation to the user. In one embodiment, given any user, the micro-segmentation system 102 quickly locates all assigned micro-segments and then utilizes the assigned micro-segments to locate product, service, and/or content offers based on the matching micro-segments to generate specific recommendations. Further, the micro-segmentation system 102 may store data regarding the recommendations upon which the user acts.

In one embodiment, before each user is classified, that user is scored against all relevant micro-segments to determine the most probable classifications. Further, micro-segment classifications may be efficiently assigned to users and searchable in real-time.

Figure 2:
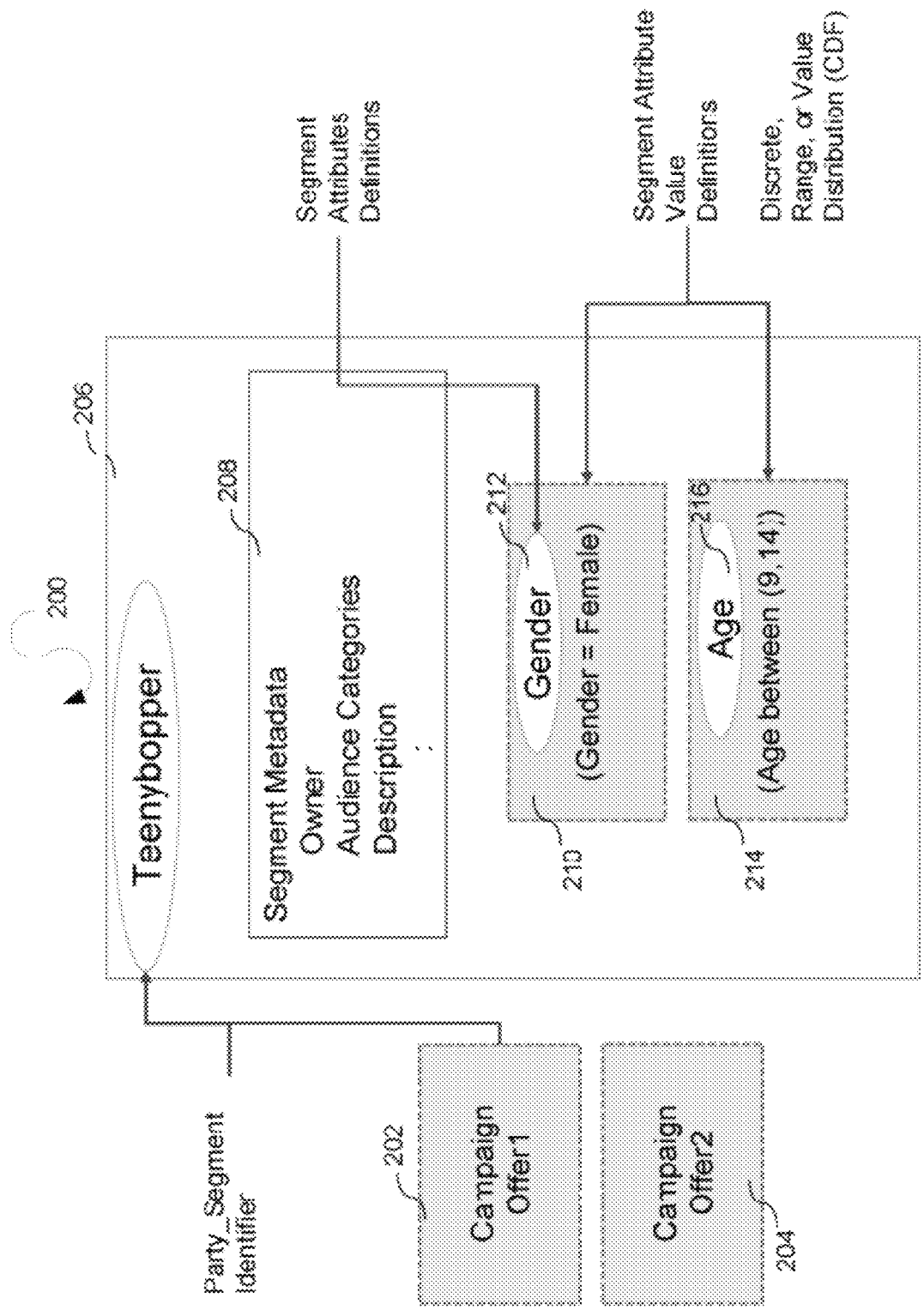
FIG. 2 illustrates a micro-segment definition and structure.

FIG. 2 illustrates a micro-segment definition and structure 200. The micro-segment definition and structure 200 has a micro-segment object 206 that may receive a campaign offer such as the first campaign offer 202 and/or the second campaign offer 204. For illustrative purposes, the micro-segment object 206 receives the first campaign offer 202. As an example, the micro-segment object 200 may receive a party_segment identifier that identifies a target party of the first campaign offer 202. For instance, the party_segment identifier may be "Teenybopper." The micro-segment object may also have segment metadata 208 that includes metadata about the segment. For example, the segment metadata 208 may have an owner name, audience categories, description of the segment, etc. The micro-segment object 206 may also have one or more segment definitions. For example, the micro-segment object 206 may have a gender segment attribute definition 212 and an age segment attribute definition 216. The micro-segment object 206 may also have segment attribute value definitions for the respective segment attribute definitions. For example, a gender segment attribute value definition 210 may equal female and an age segment attribute value definition may equal an age between nine and fourteen. Various distributions such a discrete distribution, a range distribution, or a value distribution such as Cumulative Distribution Function ("CDF") may be utilized.

Figure 3:
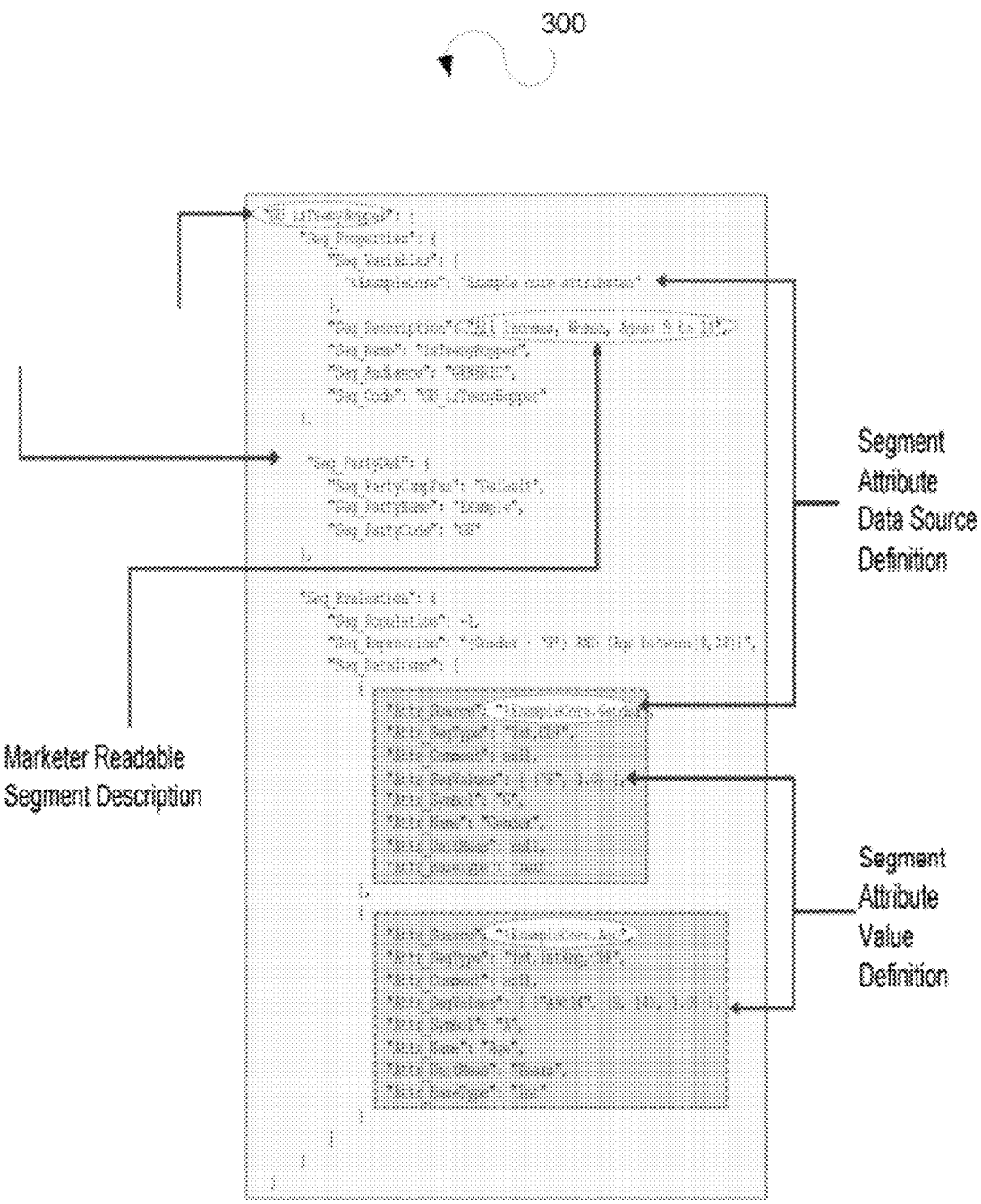
FIG. 3 illustrates an example of micro-segment definition code.

FIG. 3 illustrates an example of micro-segment definition code 300. A party_segment name portion may provide the party_segment name. As an example, the party_segment name may be "TeenyBopper." Further, a segment attribute data source definition may define the segment attribute data sources, e.g., gender. Further, a marketer readable segment description may provide a marketing description, e.g., "All Incomes, Women, Ages: 9 to 14." Further, segment attribute value definitions may be provided.

Figure 4:
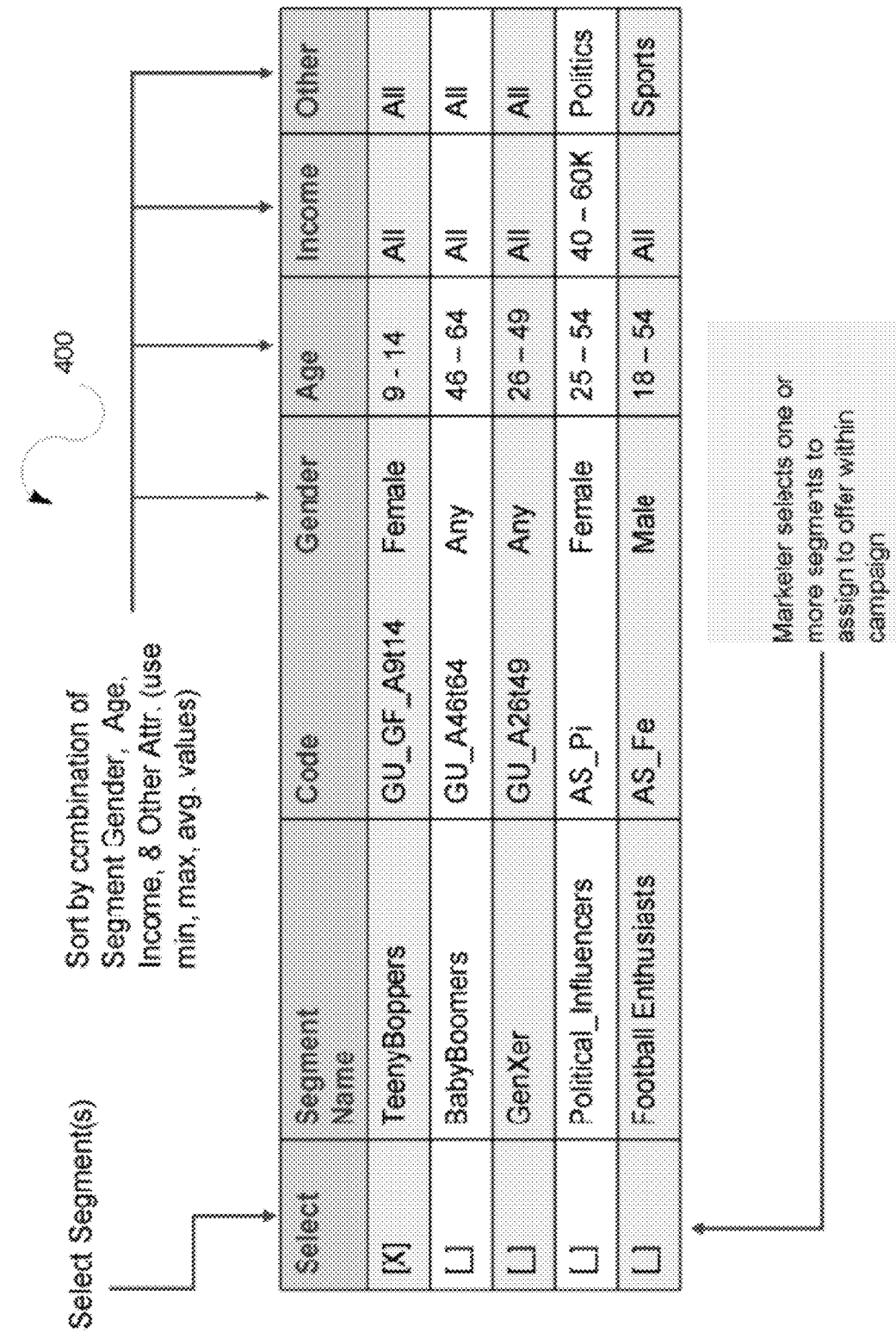
FIG. 4 illustrates an example of a graphical user interface ("GUI") that may be utilized to one more segments.

FIG. 4 illustrates an example of a GUI 400 that may be utilized to define one more segments. As an example, a marketer may select one or more segments to assign to an offer within a campaign from the GUI 400. The GUI 400 has a plurality of segments that may be selected by an input. The segments may each have a segment name, code, gender, age, income, and/or other attributes. Further, the GUI 400 may allow the user to sort by combination of segment gender, age, income, and/or other attributes. Further, minimum, maximum, and/or average values may be utilized.

Figure 5A:
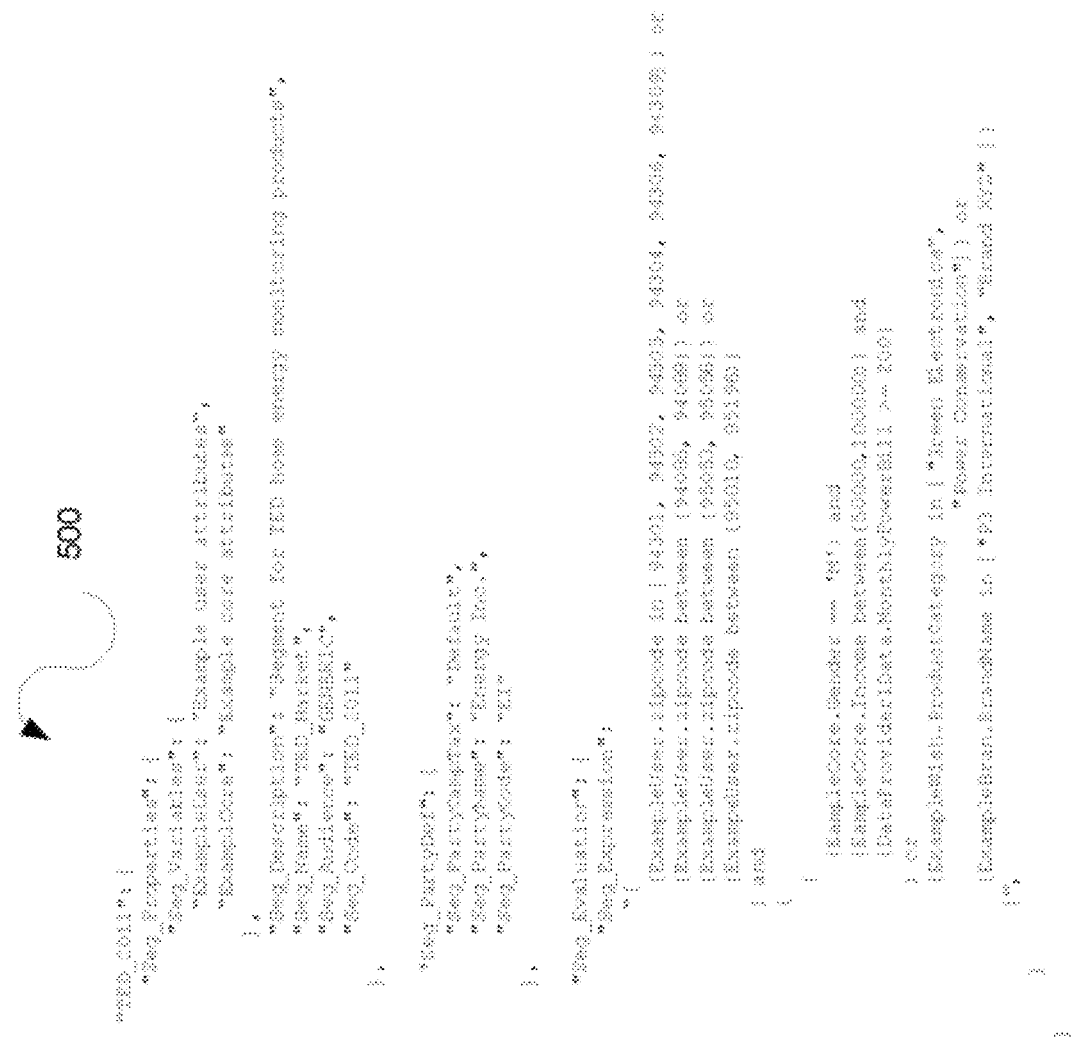
Figure 5B:
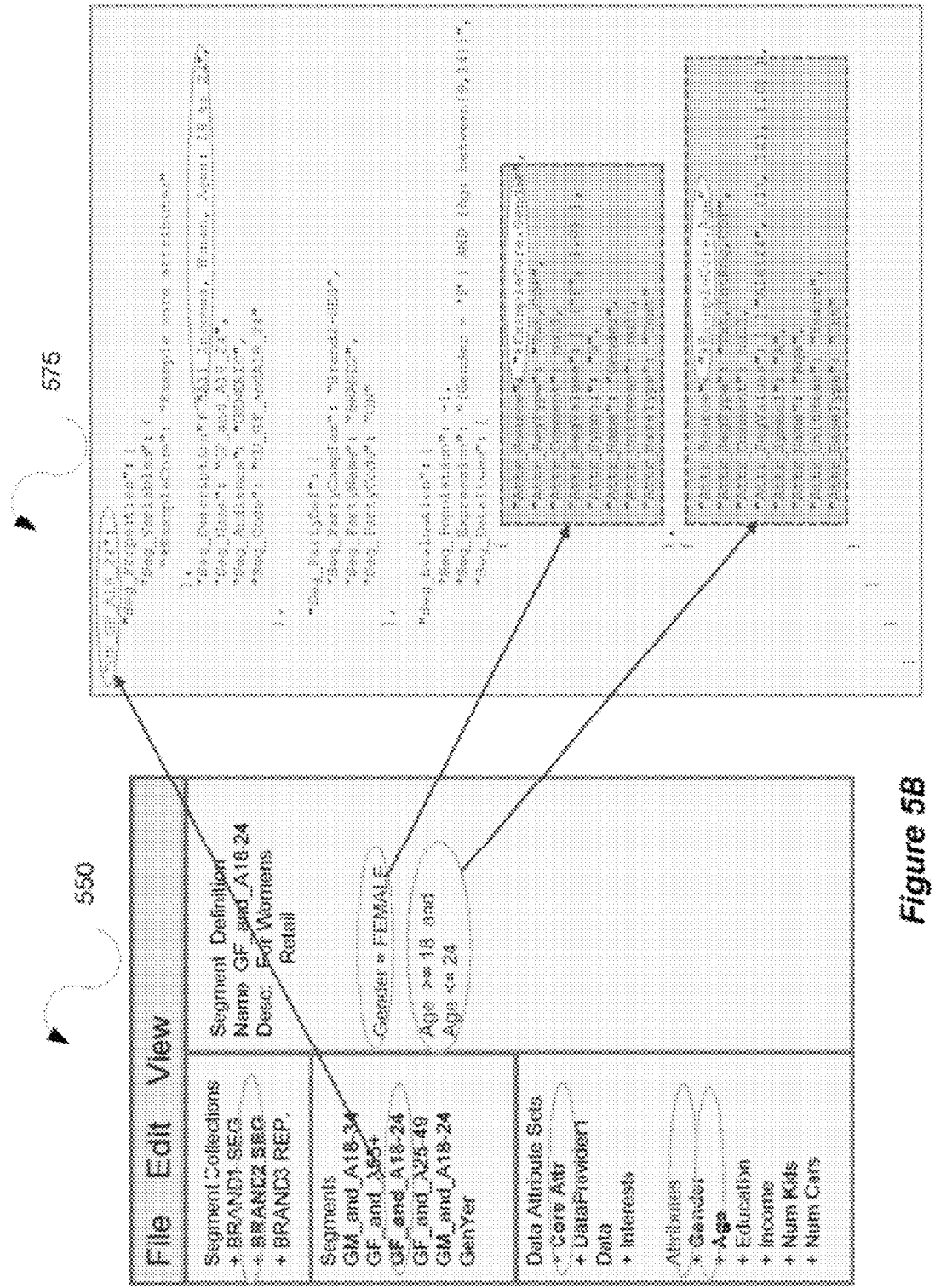
FIG. 5B illustrates an example of a segment GUI in which selections are made such that code generates segment definitions.

All of the conditions in this text description are then expressed as a collection of CONDITIONS or predicates connected by Boolean AND and OR operations. FIG. 5A illustrates an example of code 500 for the written form of the expression. In one embodiment, this segment expression can be provided directly to an evaluation and execution engine for evaluation. Further, FIG. 5B illustrates an example of a segment GUI 550 in which selections are made such that code 575 generates segment definitions.

In another embodiment, an expression parse tree based on expression syntax rules is created and provided to the evaluation and execution engine. By utilizing an expression parse tree representation, a parse step is eliminated on each expression match resulting in significantly faster execution of the segment matching expression.

Figure 6:
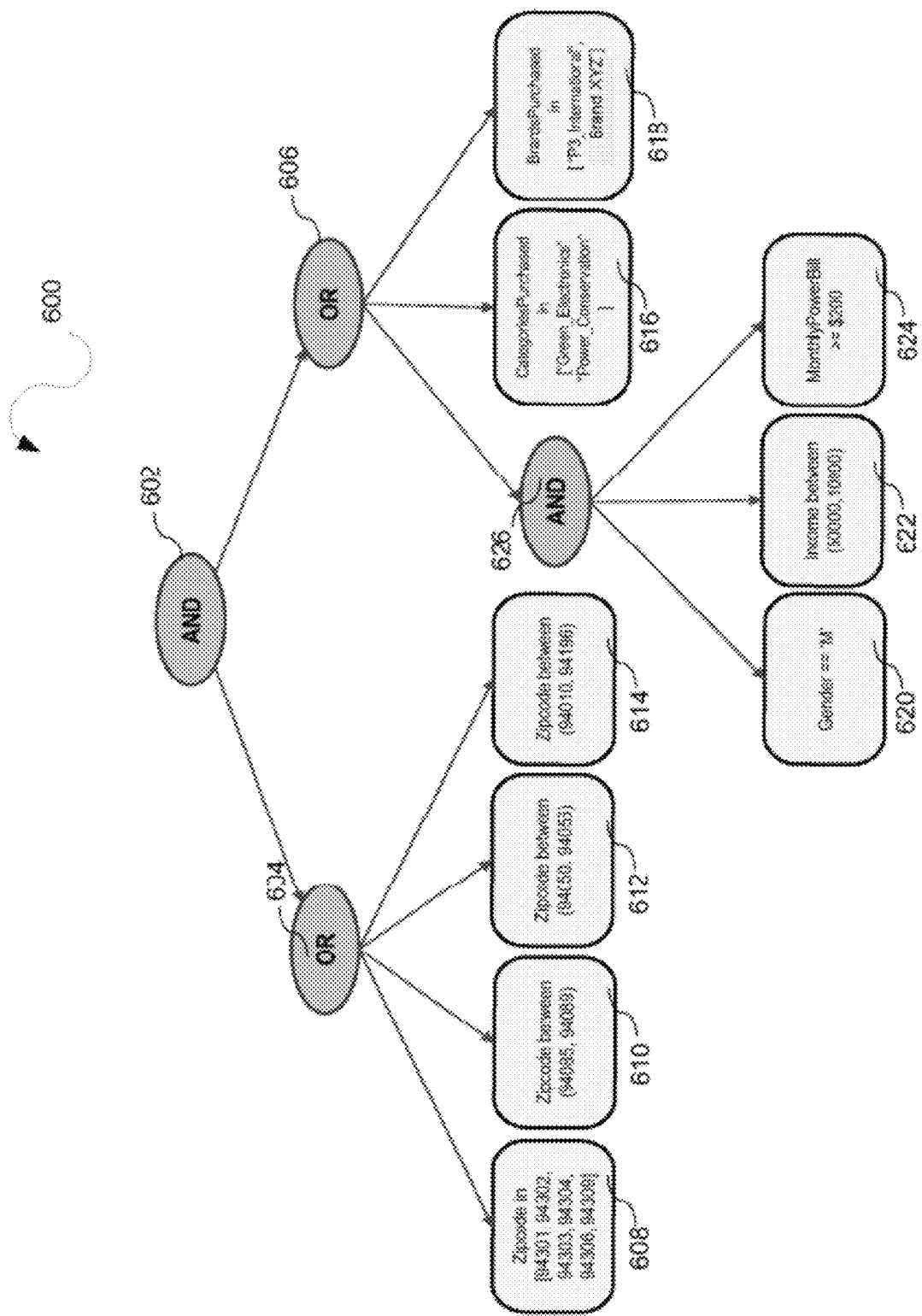
FIG. 6 illustrates an expression tree.

FIG. 6 illustrates an expression tree 600. The expression tree 600 is a tree of nodes that is created by a GUI tool. For example, a marketer who is creating segment definitions may utilize the GUI tool. Simple conditions or predicates specify a consumer attribute, e.g., zipcode, a value or list of values, e.g., 94301, 94302, . . . , and a comparison or set operator, e.g., "in." These individual conditions are evaluated, and the result of each condition is then utilized to satisfy one or more BOOLEAN expressions formed using a combination of AND or OR operators.

The expression tree 600 has a first root AND node 602, a first OR leaf node 604, and a second OR leaf node 606. The first OR leaf node 604 evaluates to TRUE if any of a first zipcode condition 608, a second zipcode condition 610, a third zipcode condition 612, or a fourth zipcode condition 614 is met. Further, the second OR leaf node 606 evaluates to true if a categories purchased condition 616 is met, a brands purchased condition 618 is met, or if an AND node 626 evaluates to TRUE. The AND node 626 evaluates to TRUE if a gender condition 620 is met, an income condition 622 is met, and a monthly power bill condition is met. The results of the first OR leaf node 604 and the second OR leaf node 606 are utilized to evaluate the AND node 602. Both results have to be TRUE for the AND node 602 to evaluate to TRUE. In other words, after all simple condition nodes are evaluated to either TRUE or FALSE and all immediate Boolean nodes are evaluated, parent Boolean nodes are evaluated by a recursive process until the root node of the expression tree is reached. At this stage, a final TRUE or FALSE value is returned to the system to determine if the consumer should be assigned into the marketer's defined segment. The micro-segment object utilizes a formal expression syntax, which describes all segment expressions that can be formed and represented. The following is an example segment definition that is provided for a manufacturer interested in targeting consumers who live in certain cities, are a specific gender, have a specified income range, have made previous purchases in certain product categories, etc.:

Consumer lives in Palo Alto, Sunnyvale, Santa Clara, or San Jose (based on Zipcode)
AND (either of:)
Consumer is a Male and
Consumer's Income is between $50K and $100K and
Consumer's DataProvider1 MonthlyPowerBill>=$200 and
OR
Consumer's products of interest are in "Green Electronics" or "Power Conservation" category or
Consumer has purchased products from brands "Brand ABC" or "Brand XYZ"

In the case when consumer attribute values are missing, conditions cannot be evaluated to be either TRUE or FALSE values and a third value NULL is used. NULL values can subsequently participate in Boolean operations by using a three-valued logic system.

The expression tree 600 is provided as an example of an expression graph. A variety of other types of acyclic graphs may be utilized. An acyclic graph is a structure that is utilized to group the expression predicates. The nodes in the acyclic graph may include different syntax elements that form predicates. The syntactic acyclic graph guarantees that the expression is a valid expression that may be executed and that there will not be any syntax errors.

FIG. 7 illustrates an example of code 700 that may be utilized to generate the expression tree 600 illustrated in FIG. 6. The specific values, conditions, node, code, etc. provided for throughout are intended only as examples. When the code 700 is parsed and compiled, the expression tree 600 is produced.

Figure 8:
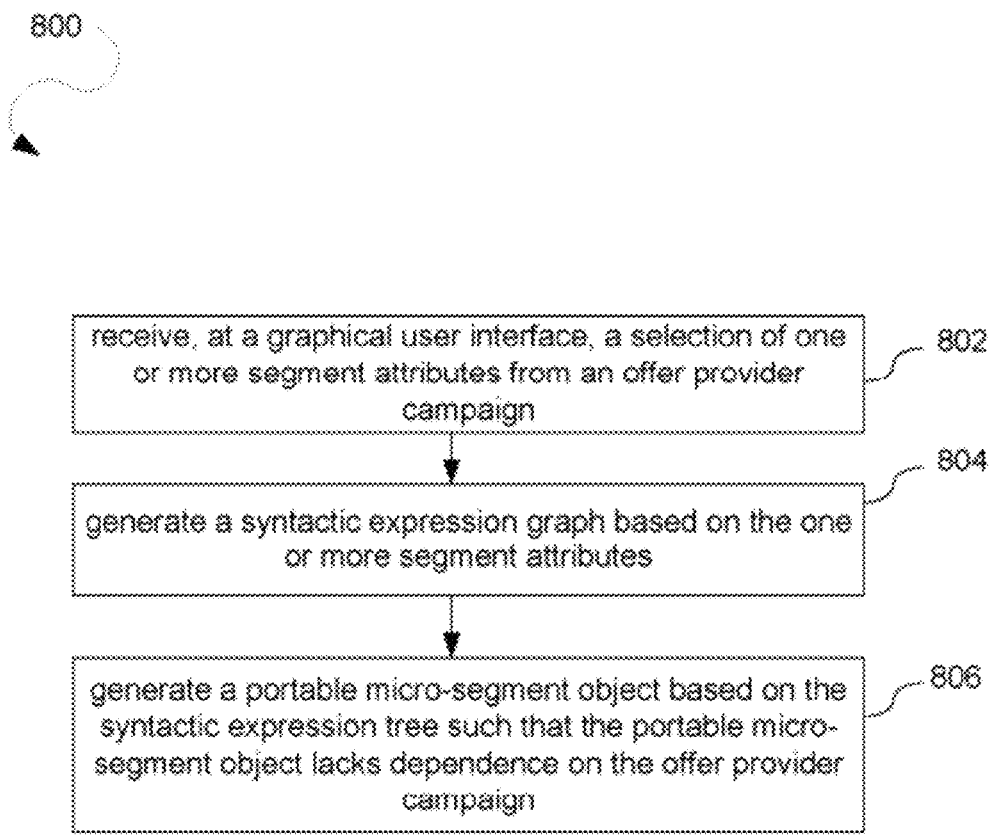
FIG. 8 illustrates a process that is utilized for defining a micro-segment object.

FIG. 8 illustrates a process 800 that is utilized for defining a micro-segment object. At a process block 802, the process 800 receives, at a graphical user interface, a selection of one or more segment attributes from an offer provider campaign. The one or more segment attributes define one or more segments that correspond to one or more offers in the offer provider campaign. Further, at a process block 804, the process 800 generates a micro-segment expression (FIG. 7) which is parsed into a syntactic expression graph based on the one or more segment attributes. In an optimized configuration, the micro-segment expression may be bypassed and the syntactic expression graph may be directly generated. In addition, at a process block 806, the process 800 generates a portable micro-segment object based on the syntactic expression tree such that the portable micro-segment object lacks dependence on the offer provider campaign.

Figure 9:
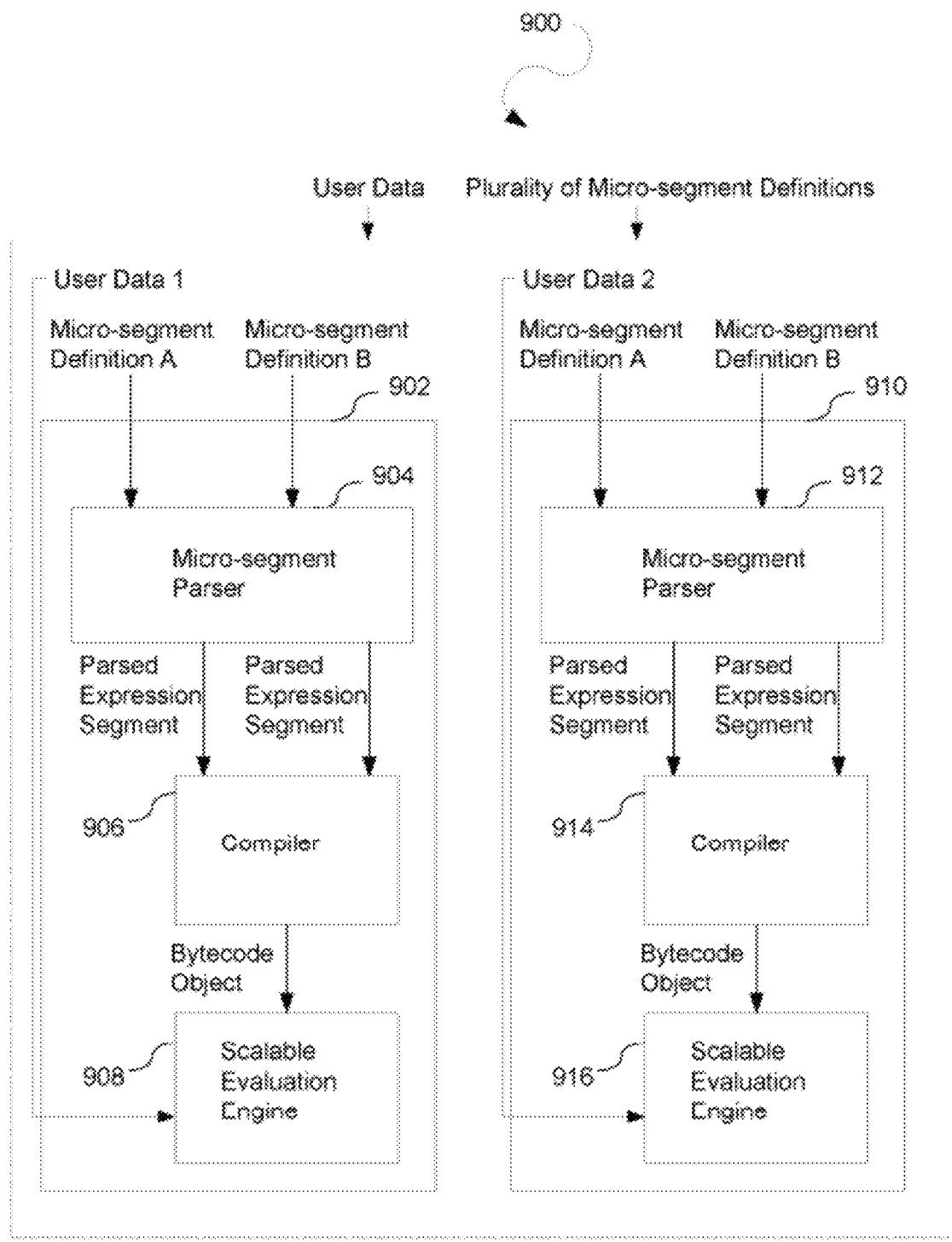
FIG. 9 illustrates a parallel processing system that computes user and offer matching into micro-segments.

FIG. 9 illustrates a parallel processing system 900 that computes user and offer matching into micro-segments. The system 900 has a plurality of subsystems that operate in parallel. Although the system 900 may have a large number of subsystems, only two subsystems are illustrated in FIG. 9 for ease of illustration as an example. The system 900 has a subsystem 902 and a subsystem 910. The system 900 receives user data and a plurality of micro-segment definitions. In one embodiment, the system 900 maps subsets of the user data and subsets of the plurality of micro-segment definitions to the subsystems for parallel processing. For example, the system 900 may utilize coordination logic to dispatch a first subset of user data and a first subset of the plurality of micro-segment definitions to the first subsystem 902. Further, the system 900 may utilize coordination logic to dispatch a second subset of user data and a second subset of the plurality of micro-segment definitions to the second subsystem 910. Various configurations may be utilized to process different types of data in parallel. For example, data for different users may be processed in parallel on different nodes. Alternatively, data for the same user may be processed in parallel on different nodes. Further, data for different micro-segment may be processed in parallel on different nodes. Alternatively, data for the same micro-segment may be processed in parallel on different nodes. Each micro-segment definition in the plurality of micro-segment definitions corresponds to one or more offers in an offer provider campaign. As an example, one or more marketers may enter the definitions of campaigns and one or more segment matching expressions and offers used by the campaign using a system GUI. Marketers may also choose to update or delete campaigns and segments. Further, the subsystem 902 includes a micro-segment parser 904 that parses each micro-segment definition from the first subset of the plurality of micro-segment definitions into a first plurality of parsed expression segments that indicate a first plurality of micro-segment condition rules. In addition, the subsystem 910 includes a micro-segment parser 912 that parses each micro-segment definition from the second subset of the plurality of micro-segment definitions into a second plurality of parsed expression segments that indicate a second plurality of micro-segment condition rules. In one embodiment, the plurality of micro-segment definitions is received in a portable micro-segment object that stores analytics without user identification data. In addition, the system 900 includes a first subsystem compiler 906 that compiles the first plurality of parsed expression segments into a first executable object, e.g., a bytecode object that indicates a plurality of instructions to determine if the user data matches the plurality of micro-segment definitions. The system 900 also includes a second subsystem compiler 914 that compiles the second plurality of parsed expression segments into a second executable object. In the most efficient configuration, the bytecode object output of compiler 906 is stored into a NoSQL database for later retrieval and the bytecode object output of compiler 914 is stored into a NoSQL database for later retrieval. In one embodiment, the instructions are high-level instructions. The first subsystem also includes a scalable evaluation engine 908 that (i) parallel processes each micro-segment definition in the first subset of the plurality of micro-segment definitions to apply the plurality of micro-segment condition rules to the first subset of user data to determine a match of a user belonging to a micro-segment, (ii) assigns a score to indicate the strength of each match, and (iii) ranks each match according to the score for each match. Further, the second subsystem also includes a scalable evaluation engine 916 that (i) parallel processes each micro-segment definition in the second subset of the plurality of micro-segment definitions to apply the plurality of micro-segment condition rules to the second subset of user data to determine a match of a user belonging to a micro-segment, (ii) assigns a score to indicate the strength of each match, and (iii) ranks each match according to the score for each match.

In one embodiment, the plurality of scalable evaluation engines may execute on multiple cores on a plurality of servers. As an example, a cloud-based web architecture with clusters of servers may be utilized. In another embodiment, the parallel evaluation engine is operated by a single core on a server. In yet another embodiment, the plurality of scalable evaluation engines are operated by multiple threads. The match may be determined according to a variety of logic systems. As an example, the match may be determined according to three-valued logic such that one or more Boolean predicates and one or more non-Boolean predicates are utilized. For instance, the Boolean values of True and False may be utilized along with the non-Boolean Value of Null. Further, the Null value may be a value between 0 and 1. As an example, 0.5 may be the Null value. The score may equal a weighting coefficient multiplied by the Boolean or non-Boolean value. For example, a first attribute may have a higher weighting coefficient than a second attribute because the first attribute may be more important to the user and/or campaign provider. Accordingly, an age attribute may have a weighting coefficient of 0.5. Therefore, the score may equal the value of Null multiplied by the weighting coefficient, e.g., 0.5×0.5=0.25.

In another embodiment, a data persistence operation is performed such that each executable object is named and stored in a database for later retrieval and use by one or more of the plurality of scalable engines. As an example, a logical but potentially physically distributed relational database, object-based or NOSQL key-value storage system, is utilized to store executable "bytecode" objects for later use.

In yet another embodiment, a load/refresh operation is performed. When the plurality of scalable evaluations engines are invoked, or when new segment definitions are created, or when existing segment definitions are updated, the plurality of scalable evaluation engines with the matching system then issues a request to load or refresh all needed segments. The Load/Refresh process may be full or incremental (using a differential configuration if only a small number of segment definitions have changed.).

In another embodiment, a match and offer delivery system utilizes the list of generated segments that a user belongs to and identifies relevant product and service offers of interest to the user based on segment criterion. A database is utilized to locate all offers associated with specific segments; these offers are sent to the delivery system for presentation to the user.

Figure 10:
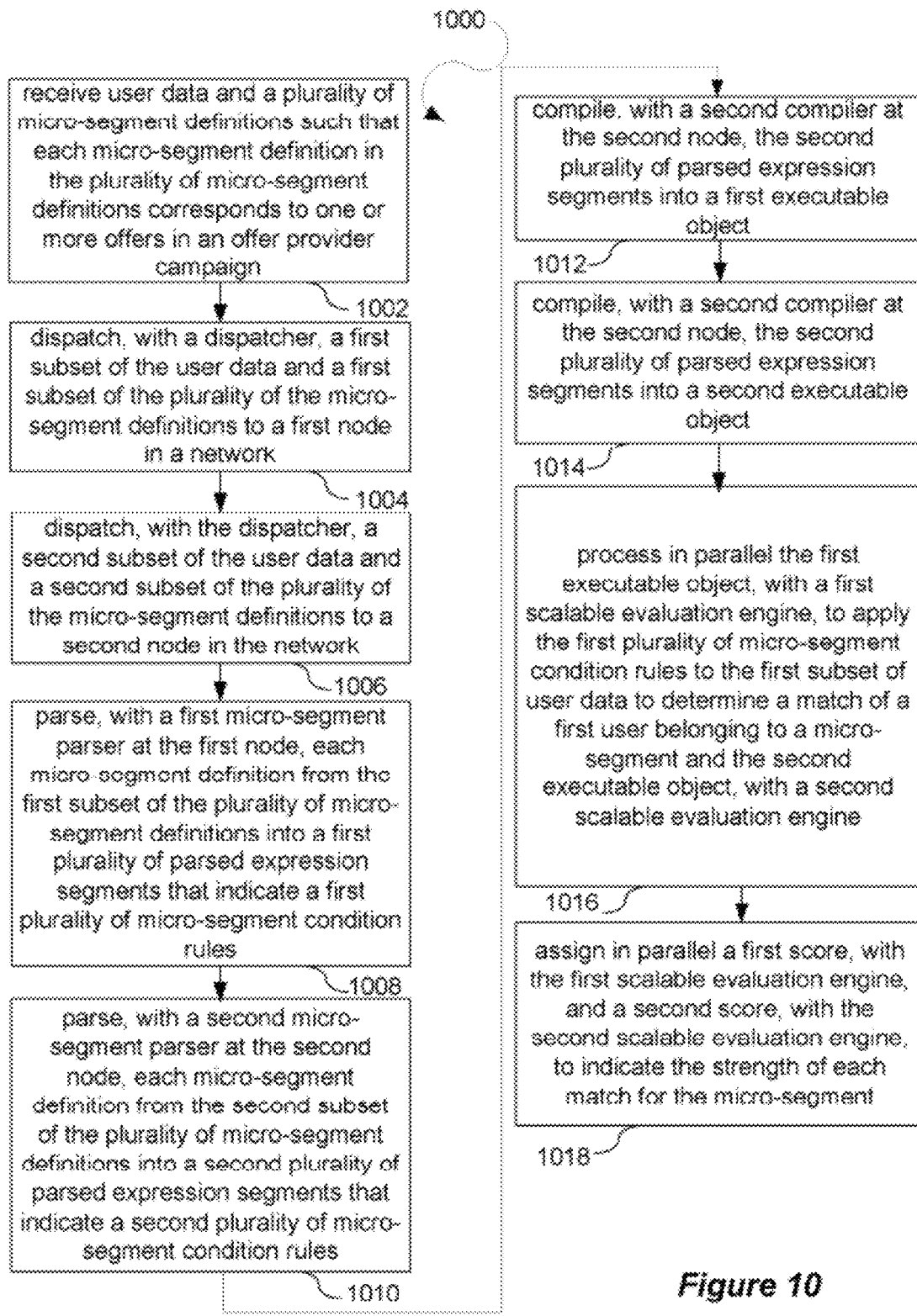
FIG. 10 illustrates a process that computes user and offer matching into micro-segments.

FIG. 10 illustrates a process 1000 that computes user and offer matching into micro-segments. At a process block 1002, the process 1000 receives user data and a plurality of micro-segment definitions such that each micro-segment definition in the plurality of micro-segment definitions corresponds to one or more offers in an offer provider campaign. Further, at a process block 1004, the process 1000 dispatches, with a dispatcher, a first subset of the user data and a first subset of the plurality of the micro-segment definitions to a first node in a network. In addition, at a process block 1006, the process 1000 dispatches, with the dispatcher, a second subset of the user data and a second subset of the plurality of the micro-segment definitions to a second node in the network. At a process block 1008, the process 1000 also parses, with a first micro-segment parser at the first node, each micro-segment definition from the first subset of the plurality of micro-segment definitions into a first plurality of parsed expression segments that indicate a first plurality of micro-segment condition rules. Further, at a process block 1010, the process 1000 parses, with a second micro-segment parser at the second node, each micro-segment definition from the second subset of the plurality of micro-segment definitions into a second plurality of parsed expression segments that indicate a second plurality of micro-segment condition rules. In addition, at a process block 1012, the process 1000 compiles, with a first compiler at the first node, the first plurality of parsed expression segments into a first executable object that indicates a first plurality of instructions to determine if the first subset of user data matches the first plurality of micro-segment definitions. At a process block 1014, the process 1000 also compiles, with a second compiler at the second node, the second plurality of parsed expression segments into a second executable object that indicates a second plurality of instructions to determine if the second subset of user data matches the second plurality of micro-segment definitions. In another configuration, the output object of 1012 is stored into a NoSQL database for later retrieval (eliminating the need for re-parse and re-compile), and the output object of 1014 is stored into a NoSQL database for later retrieval (eliminating the need for re-parse and re-compile). Further, at a process block 1016, the process 1000 processes in parallel the first executable object, with a first scalable evaluation engine, to apply the first plurality of micro-segment condition rules to the first subset of user data to determine a match of a first user belonging to a micro-segment and the second executable object, with a second scalable evaluation engine, to apply the second plurality of micro-segment condition rules to the second subset of user data to determine a match of a second user belonging to the micro-segment. In addition, at a process block 1018, the process 1000 assigns in parallel a first score, with the first scalable evaluation engine and a second score, with the second scalable evaluation engine, to indicate the strength of each match for the micro-segment.

Figure 11:
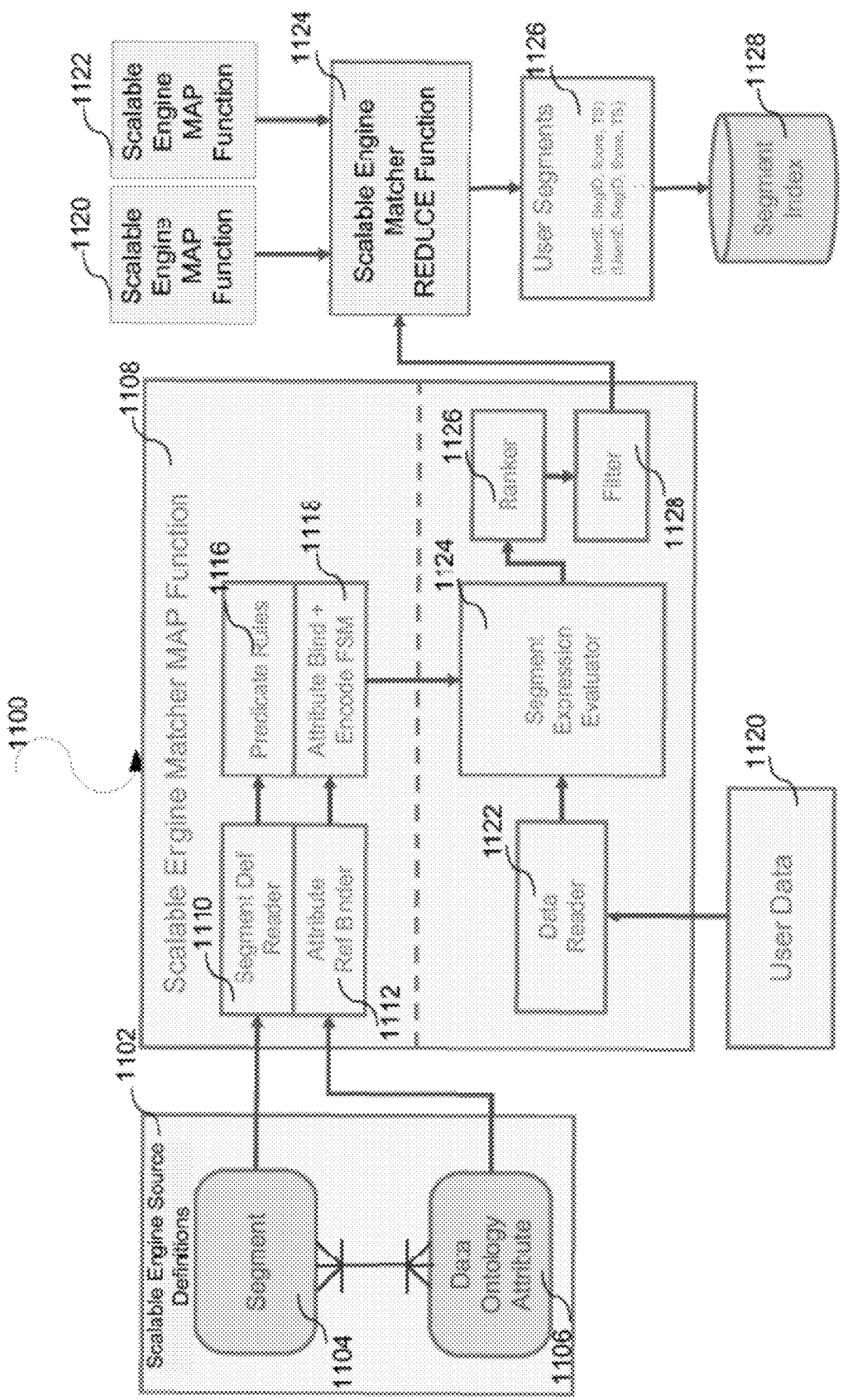
FIG. 11 illustrates a parallel engine matching system.

FIG. 11 illustrates a parallel engine matching system 1100. Scalable engine source definitions 1102 reference a data ontology attribute 1106 from a segment 1104 to access specific user data values as defined by the micro-segment predicates. A scalable engine matcher MAP function performs a mapping from a user to one or more micro-segments. The scalable engine matcher MAP function 1108 has a segment definition reader 1110 that receives the segment wrapper object 1104 and extracts segment predicate rules 1116. Further, the scalable engine matcher MAP function has an attribute reference binder 1112 that accesses the user attribute data and binds and encodes the user attribute data into the bytecode object which in conjunction with the Expression evaluator acts as an executable Finite State Machine ("FSM") 1118. Further, the scalable engine matcher MAP function has a data reader 1122 that receives user data 1120. The data reader 1122 provides the user data 1120 to a segment expression evaluator 1124, which also receives the predicate rules 1116 and the user attribute data and binds and encodes the user attribute data into the bytecode object which in conjunction with the Expression evaluator acts as an executable Finite State Machine FSM. The REDUCE function 1124 evaluates the predicate expressions and determines a score for each of the micro-segment expression based on the strength of a match of the micro-segment definition defined by 1104. Micro-segments and their scores are then provided to a ranker 1126 that ranks the micro-segments by scores. The rankings are provided to a filter 1128 that filters the micro-segment by scores and provides the filtered micro-segments to a scalable engine matcher REDUCE function 1124. The Scalable Engine Matcher REDUCE function 1124 also receives micro-segments and associated scores from a plurality of other scalable engine MAP functions from other scalable engines, e.g., scalable engines on other processing nodes. The scalable engine matcher REDUCE function 1124 aggregates the filtered micro-segment expressions from the plurality of scalable engines and generates user lists of segments 1126 for each unique micro-segment. The user lists 1126 include a user ID, segment ID, score, and time stamp ("TS"). In one embodiment, the user lists 1126 are stored in a segment index 1128 for later retrieval.

Figure 12:
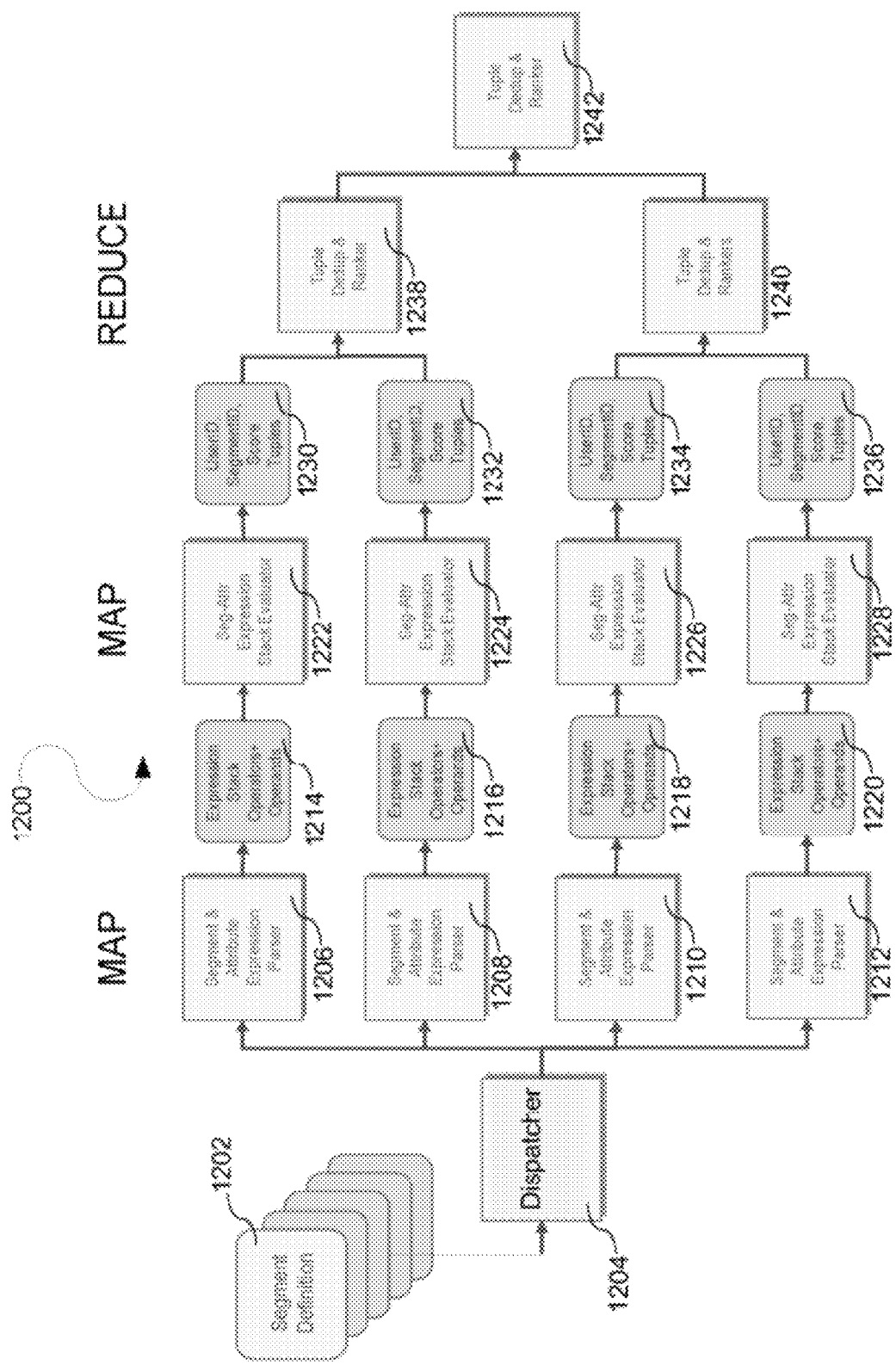
FIG. 12 illustrates a cloud-based map reduce configuration of the scalable evaluation engine architecture.

FIG. 12 illustrates a cloud-based map reduce configuration 1200 of the scalable evaluation engine architecture. A segment definition is provided to a dispatcher 1204 that distributes segment definitions to evaluation mappers. For example, the dispatcher 1204 sends a first segment to a first segment and attribute expression parser 1206, a second segment to a second segment and attribute expression parser 1208, a third segment to a third segment and attribute expression parser 1210, and a fourth segment to a segment and attribute expression parser 1212 for parallel processing at different nodes, i.e. the segment and attribute expression parsers may be located at different nodes. The first segment and attribute expression parser 1206 parses the first segment into a first expression stack of operators and operands 1214, which is provided to a segment attribute expression stack evaluator 1222. In one embodiment, the output object from the parse/compile stages are stored into a NoSQL database which is provided to each of the expression stack operators and operands respectively. This configuration avoids re-parsing and re-compiling micro-segment definitions. The segment attribute expression stack evaluator 1222 evaluates the first expression stack of operators and operands 1214 to generate tuples such as a first set of tuples 1230 including user id, segment id, and score. Further, the second segment and attribute expression parser 1208 parses the second segment into a second expression stack of operators and operands 1216, which is provided to a segment attribute expression stack evaluator 1224. The segment attribute expression stack evaluator 1224 evaluates the second expression stack of operators and operands 1216 to generate tuples such as a second set of tuples 1232 including user id, segment id, and score. As an example, a first tuple deduplication and ranker 1238 aggregates the first set of tuples 1230 and the second set of tuples 1232. In a multicore, map/reduce, or multiprocessing configuration, if segment definitions are not uniquely distributed to processing nodes, duplicate matches may be obtained. The deduplication stage filters out these duplicates.

Further, the third segment and attribute expression parser 1210 parses the third segment into a third expression stack of operators and operands 1218, which is provided to a segment attribute expression stack evaluator 1226. The segment attribute expression stack evaluator 1226 evaluates the third expression stack of operators and operands 1218 to generate tuples such as a third set of tuples 1234 including user id, segment id, and score. Further, the fourth segment and attribute expression parser 1212 parses the fourth segment into a fourth expression stack of operators and operands 1220, which is provided to a segment attribute expression stack evaluator 1228. The segment attribute expression stack evaluator 1228 evaluates the fourth expression stack of operators and operands 1220 to generate tuples such as a fourth set of tuples 1236 including user id, segment id, and score. As an example, a second tuple dedup and ranker 1240 aggregates the third set of tuples 1234 and the fourth set of tuples 1236. A third tuple dedup and ranker 1242 then receives the first aggregated set from the first tuple dedup and ranker 1238 and the second aggregated set from the second tuple dedup and ranker 1240. The third tuple dedup and ranker 1242 then aggregates the first aggregated set and the second aggregated set into a single aggregated set. The quantities of components illustrated in FIG. 11 are provided merely as examples since various quantities of components, mapping stages, and/or aggregation stages may be utilized.

Figure 13:
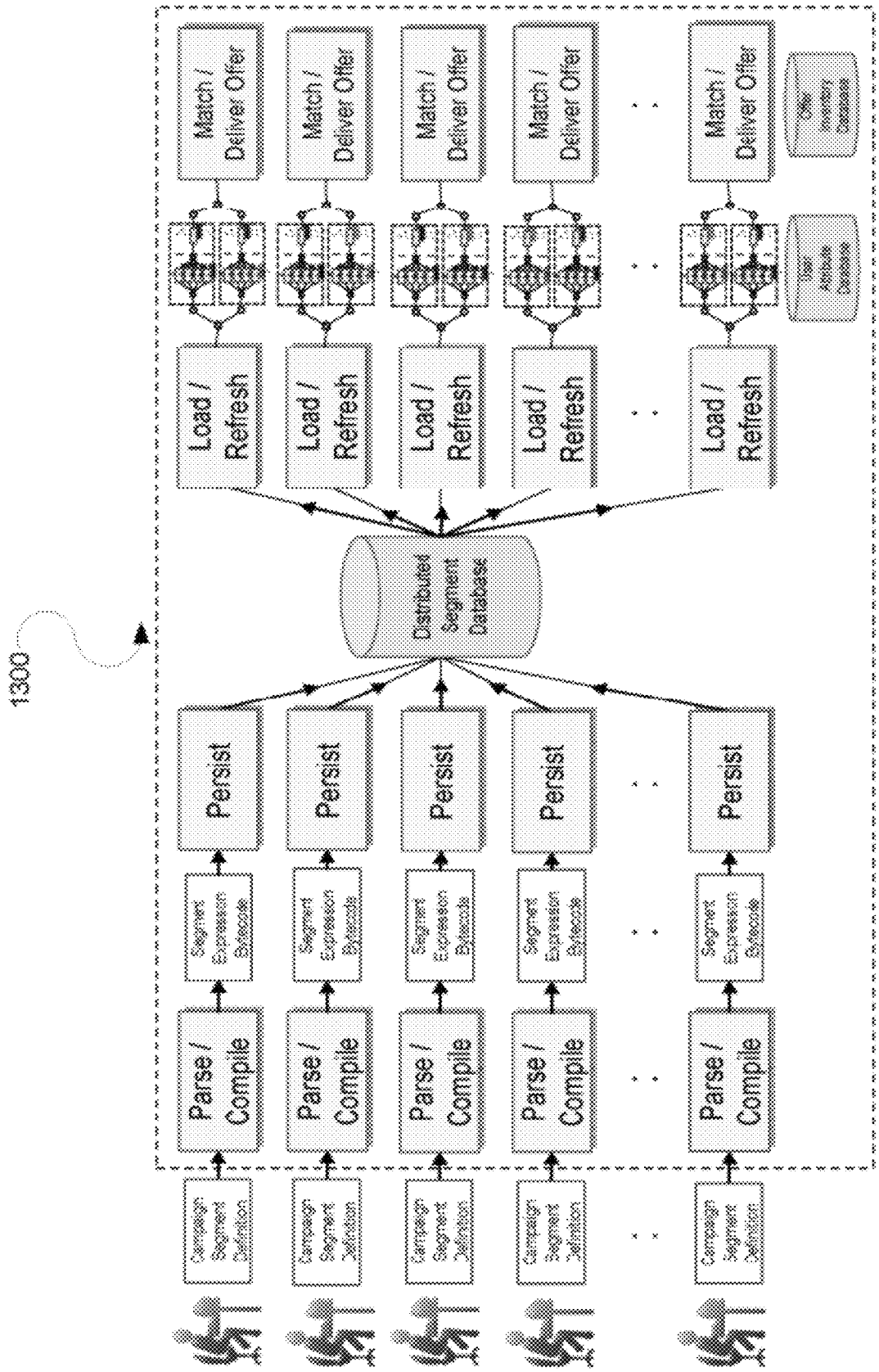
FIG. 13 illustrates a system that may be utilized for the scalable engine architecture.

FIG. 13 illustrates a system 1300 that may be utilized for the scalable engine architecture. Multiple marketers create, update, or delete their own brand campaigns including one or more segments and associated product or service offers. Further, a segment parse/compile service may run in a cloud infrastructure to independently generate segment expression bytecode objects for each marketer's campaign. In addition, segment expression bytecode objects may be sent to a persistence service. The persistence service may independently save segment bytecode objects into an underlying cloud-based scalable storage system so that bytecode objects may be retrieved later by segment name within a campaign and brand. Further, a distributed database may be utilized as storage for all created segment expression bytecode objects. The database may be a relational or object-based database. The database may alternatively be a NOSQL key-value store. In addition, load/refresh Functions may be utilized by the persistence service and evaluation engine services to ensure an up-to-date and complete set of segment bytecode objects are available to the scalable evaluation engine for execution. Further, an evaluation engine service running in a cloud computing infrastructure receives the user's data and executes all segment expression rules specified by each bytecode object to determine which segments the user belongs to. In addition, an offer match and delivery service also running in the cloud computing infrastructure then receives (user, segment, score) triples and searches an offer inventory database to determine which offers should be delivered and presented to the user. Eventual consistency semantics in the distributed segment database allows micro-segment bytecode objects can be persisted to the distributed segment database in an asynchronous manner. Micro-segment matchers are seen by the delivery system once bytecode objects are persisted and accessed on behalf of a match request.

Figure 14:
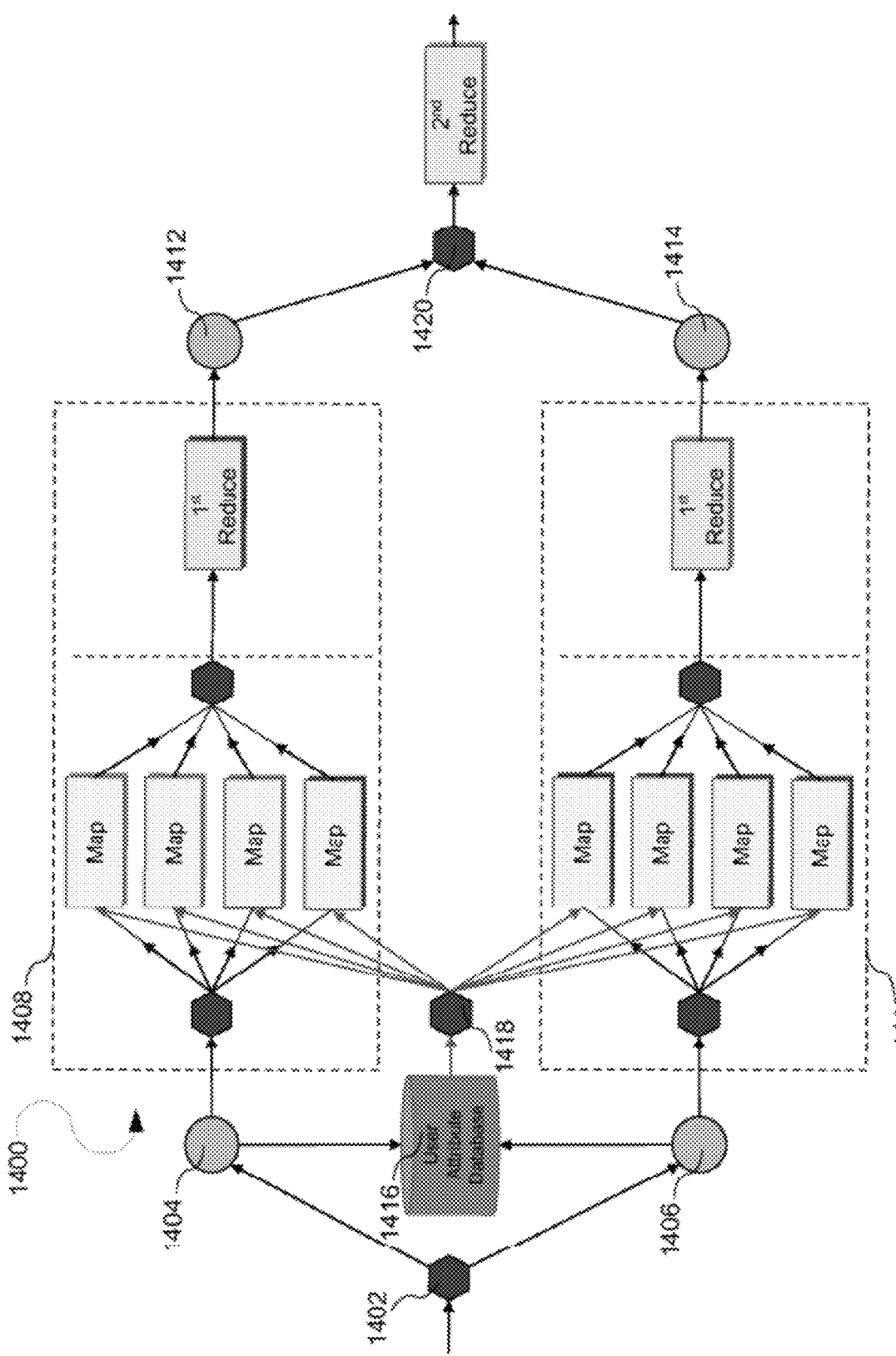
FIG. 14 illustrates an evaluation engine configuration.

FIG. 14 illustrates an evaluation engine configuration 1400. The evaluation engine configuration 1400 has a first node 1402 that controls distribution of bytecode objects and segment bytecode object collections including n bytecode objects that are to be distributed to MapReduce processing clusters such as the first MapReduce processing cluster 1408 and the second MapReduce processing cluster 1410. For example, a first process control node 1404 coordinates processing for the first MapReduce processing cluster 1408 and a second process control node 1406 coordinates processing for the second MapReduce processing cluster 1410. Each MapReduce cluster then distributes individual segment bytecode objects to a set of processing, e.g., map nodes. As an example, a first reduce/aggregate node 1412 may be utilized for the individual micro-segments from the first MapReduce processing cluster 1408 and a second reduce/aggregate node 1414. Each process control node instructs the service to fetch all needed user data attribute items from the user attributes database 1416 that will be used during segment bytecode evaluation. User data is then sent to the map nodes by a data distribution node 1418. After user data is received by each segment bytecode evaluation Map function, the bytecode object is executed by the evaluation engine logic (within the Map function) to produce the micro-segment score. All (UserID, SegmentID, Score) result triples are collected from each Map function and then sent to the first Reduce stage, which sorts and ranks the SegmentIDs by Score for further aggregating. All of the ranked (UserID, SegmentID, Score) result triple collections from each Map Reduce cluster are sent by a third node 1420 to the second Reduce stage, which sorts and ranks the SegmentIDs and Scores from each group to form a final ranking. All final ranking is then sent to the Offer Match & Delivery Service to fetch product & service offers using the offer's segmentID. Offers are stored within the offer inventory database as (OfferData, Offer-SegmentID) pairs. These offer results are then presented to the user by the Offer Match & Delivery Service.

Figure 15:
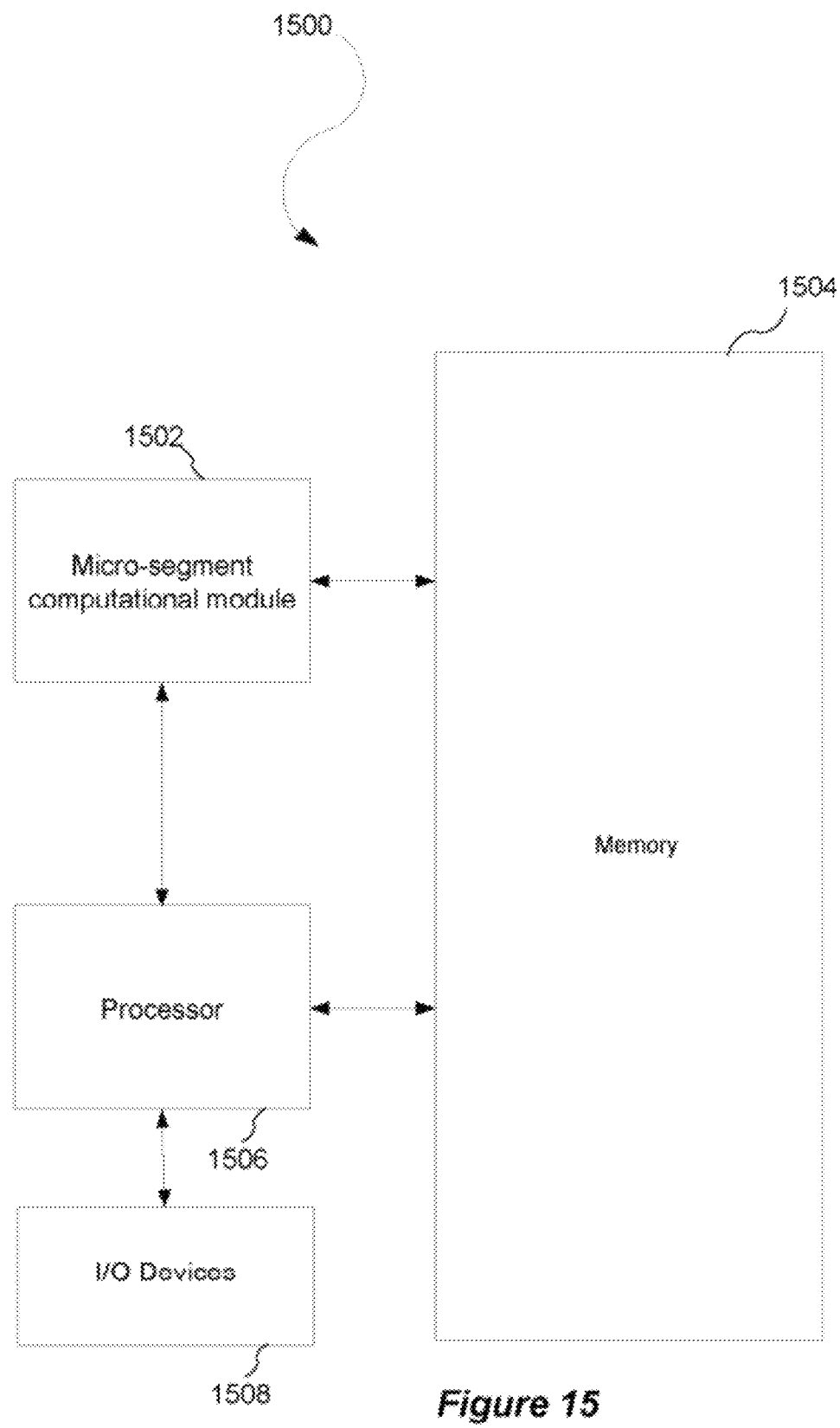
FIG. 15 illustrates a system configuration that may be utilized for computing user and offer matching into a micro-segment.

FIG. 15 illustrates a system configuration 1500 that may be utilized for computing user and offer matching into a micro-segment. In one embodiment, a micro-segment computational module 1502 interacts with a memory 1504. In one embodiment, the system configuration 1500 is suitable for storing and/or executing program code and is implemented using a general purpose computer or any other hardware equivalents. The processor 1506 is coupled, either directly or indirectly, to the memory 1504 through a system bus. The memory 1504 can include local memory employed during actual execution of the program code, bulk storage, and/or cache memories which provide temporary storage of at least some program code in order to reduce the number of times code must be retrieved from bulk storage during execution.

The Input/Output ("I/O") devices 1508 can be coupled directly to the system configuration 900 or through intervening input/output controllers. Further, the I/O devices 1508 may include a keyboard, a keypad, a mouse, a microphone for capturing speech commands, a pointing device, and other user input devices that will be recognized by one of ordinary skill in the art. Further, the I/O devices 1508 may include output devices such as a printer, display screen, or the like. Further, the I/O devices 1508 may include a receiver, transmitter, speaker, display, image capture sensor, biometric sensor, etc. In addition, the I/O devices 1508 may include storage devices such as a tape drive, floppy drive, hard disk drive, compact disk ("CD") drive, etc. Any of the modules described herein may be single monolithic modules or modules with functionality distributed in a cloud computing infrastructure utilizing parallel and/or pipeline processing.

Network adapters may also be coupled to the system configuration 1500 to enable the system configuration 1500 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes, systems, and computer program products. Therefore, it is to be understood that, within the scope of the appended claims, the present processes, systems, and computer program products may be practiced other than as specifically described herein.

We claim:

1. A computer useable storage device storing a computer readable program, wherein the computer readable program when executed on one or more processors causes the one or more processors to perform operations comprising:
receiving user data and a plurality of micro-segment definitions such that each micro-segment definition in the plurality of micro-segment definitions corresponds to one or more offers in an offer provider campaign;
parsing each micro-segment definition from the plurality of micro-segment definitions into a plurality of parsed expression segments that indicate a plurality of micro-segment condition rules;
compiling the plurality of parsed expression segments into an executable object that indicates a plurality of instructions to determine if the user data matches the plurality of micro-segment definitions;

processing the executable object to apply the plurality of micro-segment condition rules to the user data to determine a match of a user to a micro-segment;

assigning a score to indicate a strength of the match of the user to the micro-segment; and ranking the score relative to a different score for a different user assigned based on a strength of a match of the different user to the micro-segment.

2. The computer usable storage medium of claim 1, wherein the operations further comprise determining that the score exceeds a threshold score associated with the micro-segment such that the user is placed in the micro-segment.

3. The computer usable storage medium of claim 1, wherein the micro-segment definitions associated with the micro-segment include weighted attributes that are used to apply at least some of the plurality of micro-segment condition rules to the user data to determine the match of the user to the micro-segment.

4. The computer usable storage medium of claim 1, wherein the plurality of micro-segment definitions is received in a portable micro-segment object that stores analytics without user identification data.

5. The computer usable storage medium of claim 1, wherein the executable object is a bytecode object.

6. The computer usable storage medium of claim 5, wherein the computer readable program when executed on the computer is further caused to store the bytecode object in a NoSQL database.

7. The computer usable storage medium of claim 1, wherein the match of the user to the micro-segment is determined according to three-valued logic such that one or more Boolean predicates and one or more non-Boolean predicates are utilized.

8. The computer-usable storage device of claim 1, wherein the operations further comprise sorting the score for the user, the different score for the different user, and scores for other users to generate a ranked list of matches between the user, the different user, and the other users, and the micro-segment.

9. A method implemented by at least one computing device having one or more processors, the method comprising:

receiving user data and a plurality of micro-segment definitions such that each micro-segment definition in the plurality of micro-segment definitions corresponds to one or more offers in an offer provider campaign;

parsing each micro-segment definition from the plurality of micro-segment definitions into a plurality of parsed expression segments that indicate a plurality of micro-segment condition rules;

compiling the plurality of parsed expression segments into an executable object that indicates a plurality of instructions to determine if the user data matches the plurality of micro-segment definitions;

processing the executable object to apply the plurality of micro-segment condition rules to the user data to determine a match of a user to a micro-segment;

assigning a score to indicate a strength of the match of the user to the micro-segment; and ranking the score relative to a different score for a different user assigned based on a strength of a match of the different user to the micro-segment.

10. The method of claim 9, further comprising determining that the score exceeds a threshold score associated with the micro-segment such that the user is placed in the micro-segment.

11. The method of claim 9, wherein the micro-segment definitions associated with the micro-segment include weighted attributes that are used to apply at least some of the plurality of micro-segment condition rules to the user data to determine the match of the user to the micro-segment.

12. The method of claim 9, wherein the plurality of micro-segment definitions is received in a portable micro-segment object that stores analytics without user identification data.

13. The method of claim 9, wherein the executable object is a bytecode object.

14. The method of claim 9, wherein the match of the user to the micro-segment is determined according to three-valued logic such that one or more Boolean predicates and one or more non-Boolean predicates are utilized.

15. The method of claim 9, further comprising sorting the score for the user, the different score for the different user, and scores for other users to generate a ranked list of matches between the user, the different user, and the other users, and the micro-segment.

16. A system comprising:

one or more processors;

modules stored on one or more computer-readable storage devices and executable by the one or more processors, the modules including:

a reception module configured to receive user data and a plurality of micro-segment definitions such that each micro-segment definition in the plurality of micro-segment definitions corresponds to one or more offers in an offer provider campaign;

a micro-segment parser configured to parse each micro-segment definition of the plurality of micro-segment definitions into a plurality of parsed expression segments that indicate a plurality of micro-segment condition rules;

a compiler configured to compile the plurality of parsed expression segments into an executable object that indicates a plurality of instructions to determine if the user data matches the plurality of micro-segment definitions; and a scalable evaluation engine configured to:

process the executable object to apply the plurality of micro-segment condition rules to the user data to determine a match of a user to a micro-segment, including utilizing one or more weighted attributes of one or more of the micro-segment definitions to apply at least some of the plurality of micro-segment condition rules to the user data to determine the match of the user to the micro-segment; and assign a score to indicate a strength of the match of the user with the micro-segment.

17. The system of claim 16, wherein the modules further include an aggregator module configured to aggregate the score and a different score assigned based on a strength of a match of a different user to the micro-segment, and perform a ranking of the score relative to the different score.

18. The system of claim 17, wherein the aggregator module is further configured to sort the score for the user, the different score for the different user, and scores for other users to generate a ranked list of matches between the user, the different user, and the other users, and the micro-segment.

19. The system of claim 16, wherein the scalable evaluation engine is further configure to determine that the score exceeds a threshold score associated with the micro-segment such that the user is placed in the micro-segment.

20. The system of claim 16, wherein the reception module is configured to receive the plurality of micro-segment definitions in a portable micro-segment object that stores analytics without user identification data.

* * * * *